United States Patent
Ezaki et al.

(10) Patent No.: US 6,721,437 B1
(45) Date of Patent: Apr. 13, 2004

(54) DATA PROCESSING APPARATUS, CODING APPARATUS, DATA PROCESSING METHOD AND CODING METHOD

(75) Inventors: Tadashi Ezaki, Tokyo (JP); Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/497,593

(22) Filed: Feb. 3, 2000

(30) Foreign Application Priority Data

Feb. 5, 1999 (JP) .......................................... 11-029019

(51) Int. Cl.$^7$ ................................................ G06K 9/00
(52) U.S. Cl. ...................... 382/100; 382/235; 382/251; 382/250; 713/176; 380/200
(58) Field of Search ................................ 382/100, 239, 382/245, 246–247, 248, 250, 251, 235; 713/176, 179; 375/240.08; 704/219; 707/101, 200; 386/94; 380/217, 212, 200, 203; 235/381

(56) References Cited

U.S. PATENT DOCUMENTS

| | | | | |
|---|---|---|---|---|
| 4,760,461 A | * | 7/1988 | Sato ............................. 341/63 |
| 5,574,568 A | * | 11/1996 | Juri et al. .................... 386/112 |
| 5,727,092 A | * | 3/1998 | Sandford et al. ............ 382/251 |
| 5,731,767 A | * | 3/1998 | Tsutsui et al. ................. 341/50 |
| 5,778,102 A | * | 7/1998 | Sandford et al. ............ 382/251 |
| 5,805,544 A | * | 9/1998 | Haneda .................... 369/47.23 |
| 5,949,953 A | * | 9/1999 | Shirakawa et al. ........... 386/70 |
| 6,081,649 A | * | 6/2000 | Asamura et al. .............. 386/81 |
| 6,278,836 B1 | * | 8/2001 | Kawara et al. ................ 386/94 |
| 6,370,319 B1 | * | 4/2002 | Matsumoto et al. .......... 386/94 |
| 6,434,322 B1 | * | 8/2002 | Kimura et al. ................ 386/94 |
| 2001/0016836 A1 | * | 8/2001 | Boccon-Gibod et al. ...... 705/51 |

* cited by examiner

Primary Examiner—Jayanti K. Patel
Assistant Examiner—Barry Choobin
(74) Attorney, Agent, or Firm—Frommer Lawrence & Haug LLP; William S. Frommer; Hans R. Mahr

(57) ABSTRACT

The invention provides a data processing apparatus and method which processes data in which additional data is embedded and inhibits illegal accessing from the outside to prevent alteration of information. The data processing apparatus includes a coding section for coding the data, a detection section for detecting the additional data from the data, a processing section for processing the coded data coded by the coding section, and a control section for controlling operation of the processing section in response to the additional data detected by the detection section. The coding section controls an output thereof in response to the additional data detected by the detection section, and accessing to the additional data used to control the coding section is inhibited.

36 Claims, 14 Drawing Sheets

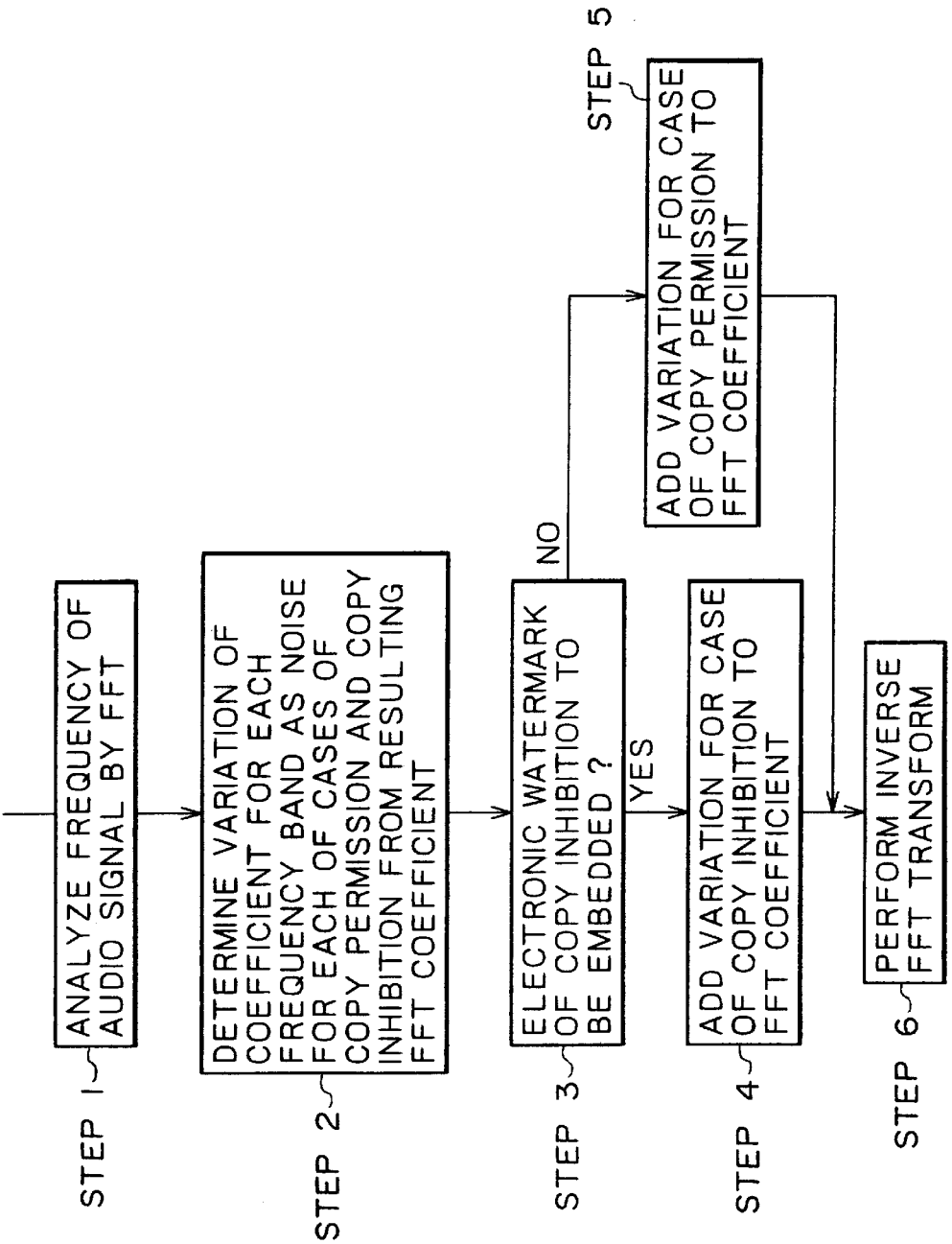

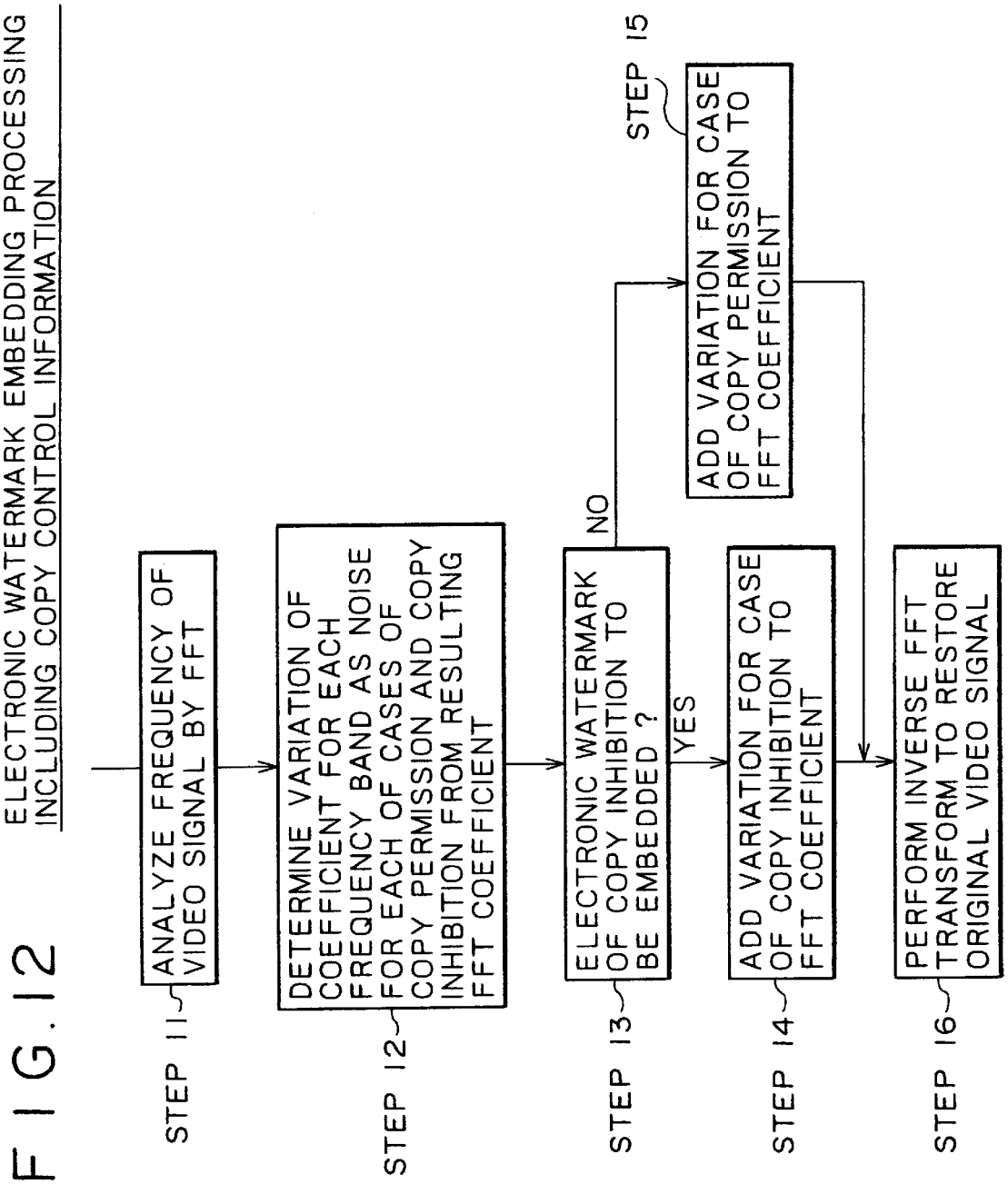

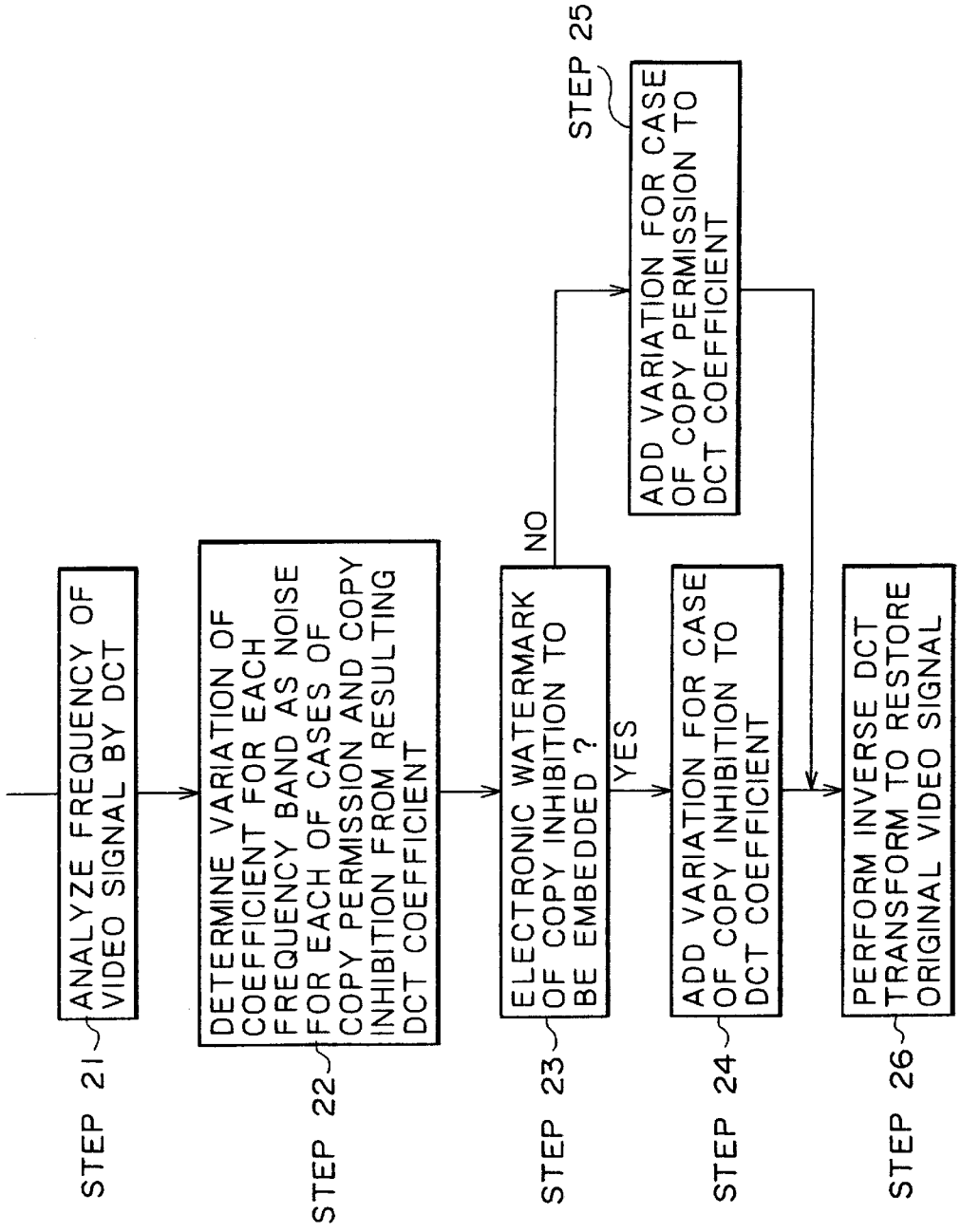

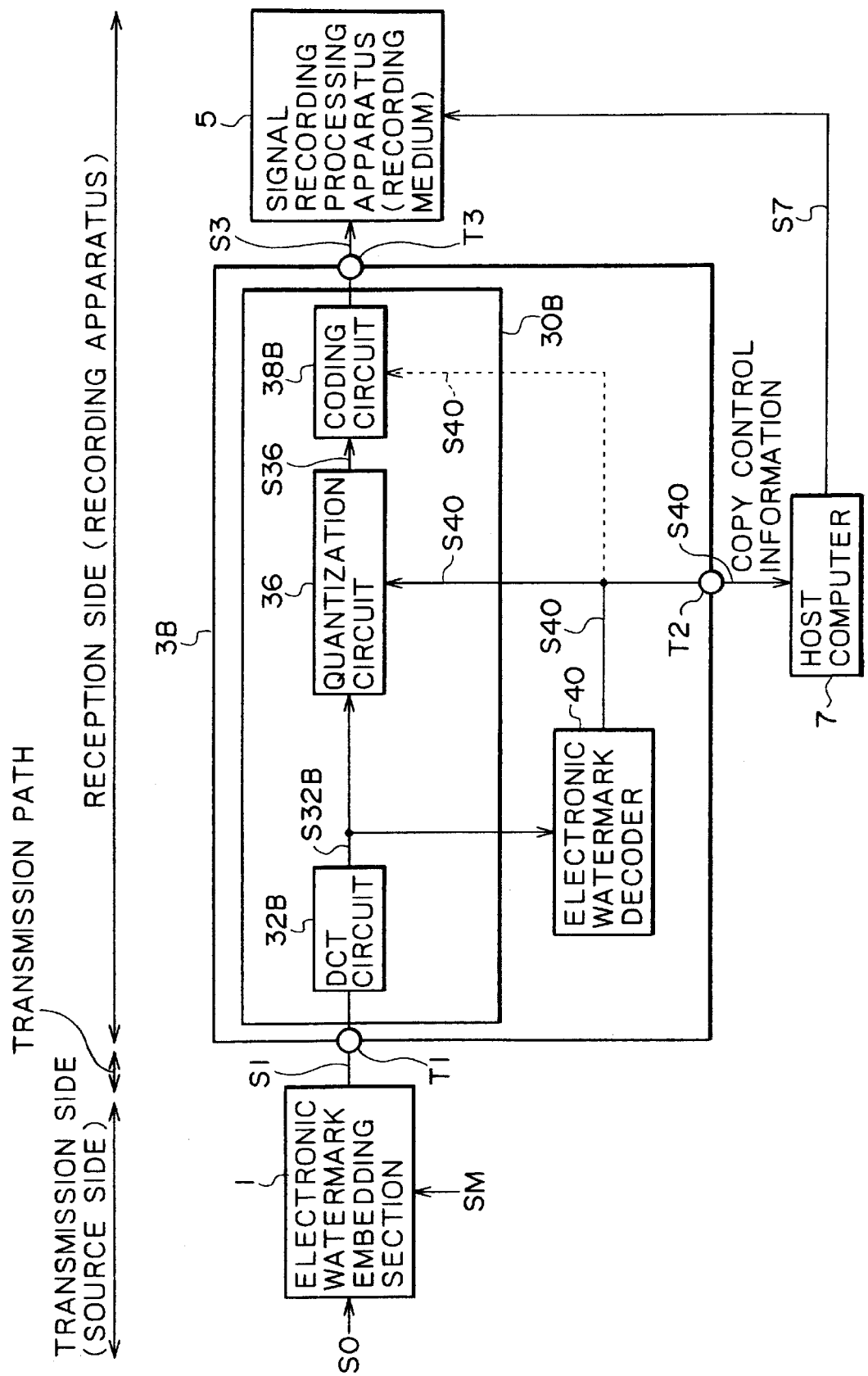

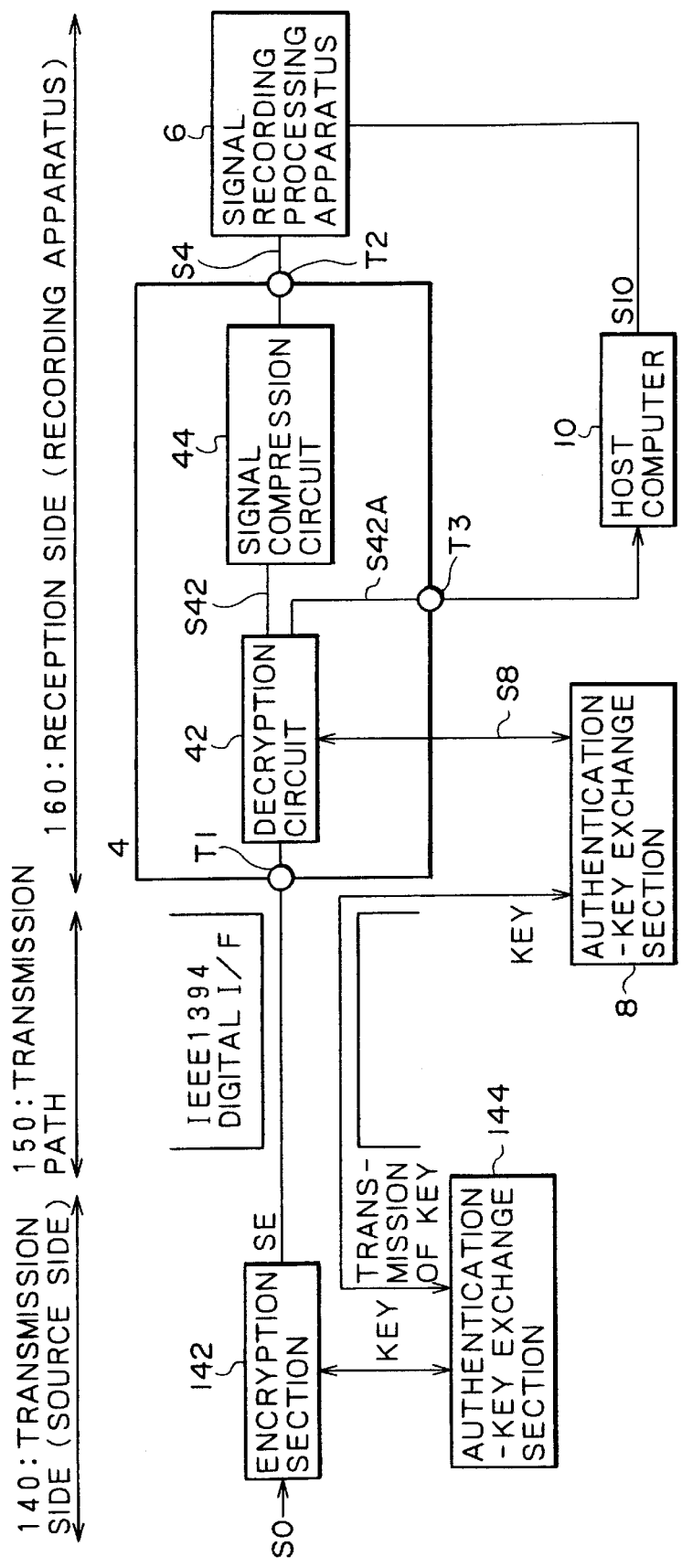

DATA PROCESSING APPARATUS, CODING APPARATUS, DATA PROCESSING METHOD AND CODING METHOD

BACKGROUND OF THE INVENTION

This invention relates to a technique for controlling copying of multimedia data composed of a video signal, an audio signal and so forth, and more particularly to a data processing apparatus wherein a decoder for decoding an electronic watermark (digital watermark) for copy control is built in an encoder for coding a video signal and/or an audio signal in order to protect the video signal and/or the audio signal against alteration.

Prevention of illegal copying or alteration of music or acoustic data (hereinafter referred to as audio signal) recorded on a CD (compact disc), prevention of illegal copying or alteration of a video signal (image signal) and an audio signal recorded on a DVD (digital video disc), prevention of illegal use or alteration of multimedia data transmitted over a digital broadcasting network and other protection of the copyright of multimedia data have been attempted from various points of view.

From the point of view of protection of the copyright, various attempts have been made to prevent illegal copying of literary works of multimedia data such as, for example, an image signal (or video signal) and an audio signal. It is to be noted that such information may sometimes be hereinafter referred to as contents.

FIG. 1 shows a concept of a system which carries out a copy control method.

Referring to FIG. 1, in order to effect copy control, an apparatus (signaling section) 110 on the source side signals copy control information together with contents (information) into a signal transmission path 120 so as to be transmitted to a recording apparatus 130 on the reception side. The signal transmission path 120 may take various forms such as broadcasting, package media and network distribution. A copy control information detection circuit 134 of the reception side recording apparatus 130 detects the copy control information from the contents transmitted thereto and produces a recording operation control signal representative of whether or not recording is permitted. A recording processing circuit 132 records the received contents onto a recording medium such as, for example, a CD only when the recording operation control signal indicates permission of recording. Naturally, if the recording operation control signal indicates inhibition of recording, the recording processing circuit 132 does not perform a recording operation onto the recording medium.

However, while the recording operation control signal originally indicates inhibition of recording (inhibition of copying), if it is altered so that it indicates permission of recording (permission of copying), then a recording operation onto the recording medium is performed by the recording processing circuit 132. Therefore, such alteration of the recording operation control signal must be prevented. Now, a method of such prevention is described.

FIG. 2 illustrates an example of copy control information for a digital audio signal.

Referring to FIG. 2, the copy control signal for a digital audio signal includes a bit representative of presence or absence of copyright, a generation bit and a category bit in a digital interface illustrated in FIG. 2 in accordance with the provisions of the SCMS (Serial Copy Management System). The copy control signal is multiplexed into contents of a signal addition section 112 of the source side apparatus 110, in this instance, into a digital audio signal, and transmitted over the signal transmission path 120 to the reception side recording apparatus 130 such as, for example, a DAT (Digital Audio Tape) recording apparatus or an MD (Mini Disc: trademark) recording apparatus. Then, the copy control signal is detected by the copy control information detection circuit 134 of the reception side recording apparatus 130 and used to control recording of the recording processing circuit 132.

An example of copy control information for a video signal is illustrated in FIGS. 3A and 3B.

Referring to FIGS. 3A and 3B, CGMS (Copy Generation Management System) bits are multiplexed into contents, in this instance, into a video signal, by the signal addition section 112 of the source side apparatus 110 within a VBI (vertical blanking interval) and transmitted to the signal transmission path 120. Then, the CGMS bits are detected by the copy control information detection circuit 134 of the reception side recording apparatus 130 such as a DVD recording apparatus and used to control recording processing of the recording processing circuit 132.

The SCMS bits for an audio signal and the CGMS bits for a video signal described above are laid open as formats for transmission systems and can be acquired readily by a third party. Therefore, there is the possibility that, although a copy control signal or a recording operation control signal indicates inhibition of copying, it may be altered so as to indicate permission of copying.

As a countermeasure for overcoming the problem just described, several methods which provide augmented security have been proposed. One of the proposed methods employs a SDS (Secure Digital Bus) system, and another one of the methods adopts an electronic watermark.

FIG. 4 shows a system which employs a SDS system.

Referring to FIG. 4, in the SDS (Secure Digital Bus) system, an authentication-key exchange section 144 of a transmission side apparatus 140 exchanges information of a key and so forth with an authentication-key exchange section 164 of a reception section 160, which is the other party of communication, over a signal transmission section 150 which has an IEEE (Institute of Electrical and Electronics Engineers) 1394 digital interface. The transmission side apparatus 140 side authenticates whether or not a decryption section 162 which is the other party of communication has a copy control function legally. Then, only if the other party has a legal copy control function, original contents S0 are encrypted by an encryption section 142 and transmitted to the reception section 160 over the signal transmission section 150. The original contents S0 in this instance may be one or both of a video signal and an audio signal or multimedia data.

In the SDB system, even if the signal transmission section 150 tries to alter a signal on the digital interface, this is impossible if a third party who tries to illegally use the transmission signal cannot decrypt the signal. Accordingly, the SDB system is considered to be an information transmission system which is high in security in a transmission path.

The electronic watermark (digital watermark, digital data embedding, or digital data hiding) technique embeds some information into contents so that the contents may have the information in a hidden state. When an electronic watermark is embedded into contents, for example, into a video signal, the electronic watermark is embedded into the video signal in such a form that it cannot be perceived (visually observed) readily by the eyes of a human being while the video signal itself is maintained. When an electronic watermark is embedded into an audio signal, it is embedded in such a form that it cannot be perceived readily by the sense of hearing of a human being while the audio signal itself is maintained.

It has been proposed to combine such an electronic watermark technique as described above with an illegal copying prevention technique for digital literary works (for example, "The 'Electronic Watermark' Protects the Multimedia Age", *Nikkei Electronics*, Feb. 24, 1997, pp.99–124).

Various methods have been proposed to embed electronic watermark information into digital multimedia data. An exemplary one of the methods is described.

FIGS. 5A, 5B and 5C illustrate an example of an electronic watermark for an audio signal.

According to the electronic watermark technique, the following processing is performed. First, frequency components of the audio signal are analyzed to select those frequency components f1, f2, f3 and f4 (indicated by slanting lines in FIG. 5A) whose deletion has a comparatively little influence on the audio signal. Then, the selected frequency components are deleted once (blank portions of FIG. 5B corresponding to the slanting line portions of FIG. 5A). Further, into each of the deleted frequency components, a signal which has a level higher than a predetermined level indicating the value "1" and exhibits a certain degree of continuity to signal levels of adjacent signals or another signal which has a level lower than another predetermined level indicating the value "0" and exhibits a certain degree of continuity to signal levels of adjacent signals is inserted (as a replaced signal) as seen in FIG. 5C.

Various methods of embedding an electronic watermark into contents have been proposed in addition to the method described above. For example, an electronic watermark can be embedded not only into an audio signal as described above but also into a video signal.

Subject of the SDB System

A problem provided by the SDB (Secure Digital Bus) system illustrated in FIG. 4 is described below with reference to a system construction shown in FIG. 6.

In the SDB system shown in FIG. 4, the signal transmission section 150 surely has a high degree of security against stealing of a transmission signal and alteration of the transmission signal. However, the reception section 160 has some problem.

As seen from FIG. 6, after the authentication-key exchange section 164 performs authentication by exchange of a key with the authentication-key exchange section 144 of the transmission side apparatus 140 side, the decryption section 162 receives encrypted information and decrypts it. When the decryption section 162 decrypts the encrypted information, also the copy control information is decrypted together with the encrypted contents. A signal compression section 166 compresses the decrypted contents, for example, an audio signal. A recording signal processing circuit 170 records the compressed audio signal, for example, onto a CD or an MD. In this instance, in order to control operation of the recording signal processing circuit 170, a host computer 180 produces a control signal based on the copy control information decoded by the decryption section 162. In particular, the host computer 180 produces a control signal for inhibiting operation of the recording signal processing circuit 170 when the copy control information indicates inhibition of copying, but produces another control signal for permitting recording by the recording signal processing circuit 170 when the copy control information indicates permission of copying. When the recording signal processing circuit 170 records the compressed audio signal onto a CD or an MD, the operation thereof is controlled in accordance with the control signal.

However, in a path A along which the copy control information decoded by the decryption section 162 is signaled to the host computer 180, although the copy control information indicates inhibition of copying, there is the possibility that the copy control information may be stolen and altered so as to indicate permission of copying.

Accordingly, also in the SDB system wherein authentication processing is performed using a key and contents are encrypted and transmitted to assure the security of transmission of the signal transmission section 150, there is the possibility that the reception side apparatus may not maintain the security and copy control information or the like may be altered.

Subject Where an Electronic Watermark is Used

A construction and processing of a reception side apparatus where an electronic watermark is embedded in contents are described with reference to FIG. 7.

Contents such as, for example, an audio signal in which an electronic watermark is embedded are compressed by a signal compression section 202 of a reception side apparatus 200 and recorded onto a recording medium such as a CD or an MD by a recording signal processing circuit 206. Upon such recording, the electronic watermark is detected by an electronic watermark detection circuit 204 from the contents transmitted from the transmission side (source side) apparatus and having the electronic watermark embedded therein. The electronic watermark detection circuit 204 produces copy control information representative of inhibition or permission of copying in response to the detected value. The method of detecting an electronic watermark by the electronic watermark detection circuit 204 can be determined depending upon the method used to embed the electronic watermark on the transmission side.

The copy control information produced by the electronic watermark detection circuit 204 is signaled to a host computer 208. The host computer 208 produces a control signal for controlling operation of the recording signal processing circuit 206 from the copy control information and applies the control signal to the recording signal processing circuit 206. The recording signal processing circuit 206 performs a recording operation only when the control signal indicates permission of a recording operation.

Also in this instance, there is the possibility that, in the path along which the copy control information is transmitted from the electronic watermark detection circuit 204 to the host computer 208, the copy control information may be stolen and altered.

Common Subject

The problem common to both of the apparatus described above is that, to whichever degree the security is raised by embedding of an electronic watermark or encryption on the transmission side or the security in the transmission path is raised by performing authentication and key exchanging processing, the possibility is still high that copy control information may be stolen or altered readily on the reception side.

A countermeasure or specifications effective to raise the security in secrecy of information in a transmission path between different apparatus on the reception side have not been proposed till now.

SUMMARY OF THE INVENTION

It is an object of the present invention to provide a data processing apparatus and a data processing method which inhibits illegal accessing from the outside and prevents alteration of information.

In order to attain the object described above, according to an aspect of the present invention, there is provided a data processing apparatus for processing data in which additional data is embedded, comprising coding means for coding the data, detection means for detecting the additional data from the data, processing means for processing the coded data coded by the coding means, and control means for controlling operation of the processing means in response to the additional data detected by the detection means, the coding means controlling an output thereof in response to the additional data detected by the detection means, accessing to the additional data used to control the coding means being inhibited.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 10 is a flow chart illustrating a method of embedding an electronic watermark including copy control information into a result of fast Fourier transform of an audio signal as a second example of an electronic watermark embedding method;

FIG. 12 is a flow chart illustrating a method of embedding an electronic watermark including copy control information into a result of fast Fourier transform of a video signal as a third example of an electronic watermark embedding method;

FIG. 13 is a flow chart illustrating a method of embedding an electronic watermark including copy control information into a result of discrete cosine transform of a video signal as a fourth example of an electronic watermark embedding method;

FIG. 14 is a block diagram showing a detailed construction of another form of the electronic watermark signal compression processing system shown in FIG. 8; and FIG. 15 is a block diagram of an encrypted signal compression processing system in which another coding circuit and another data processing apparatus to which the present invention is applied are incorporated.

DESCRIPTION OF THE PREFERRED EMBODIMENTS

First Embodiment

Figure 8:
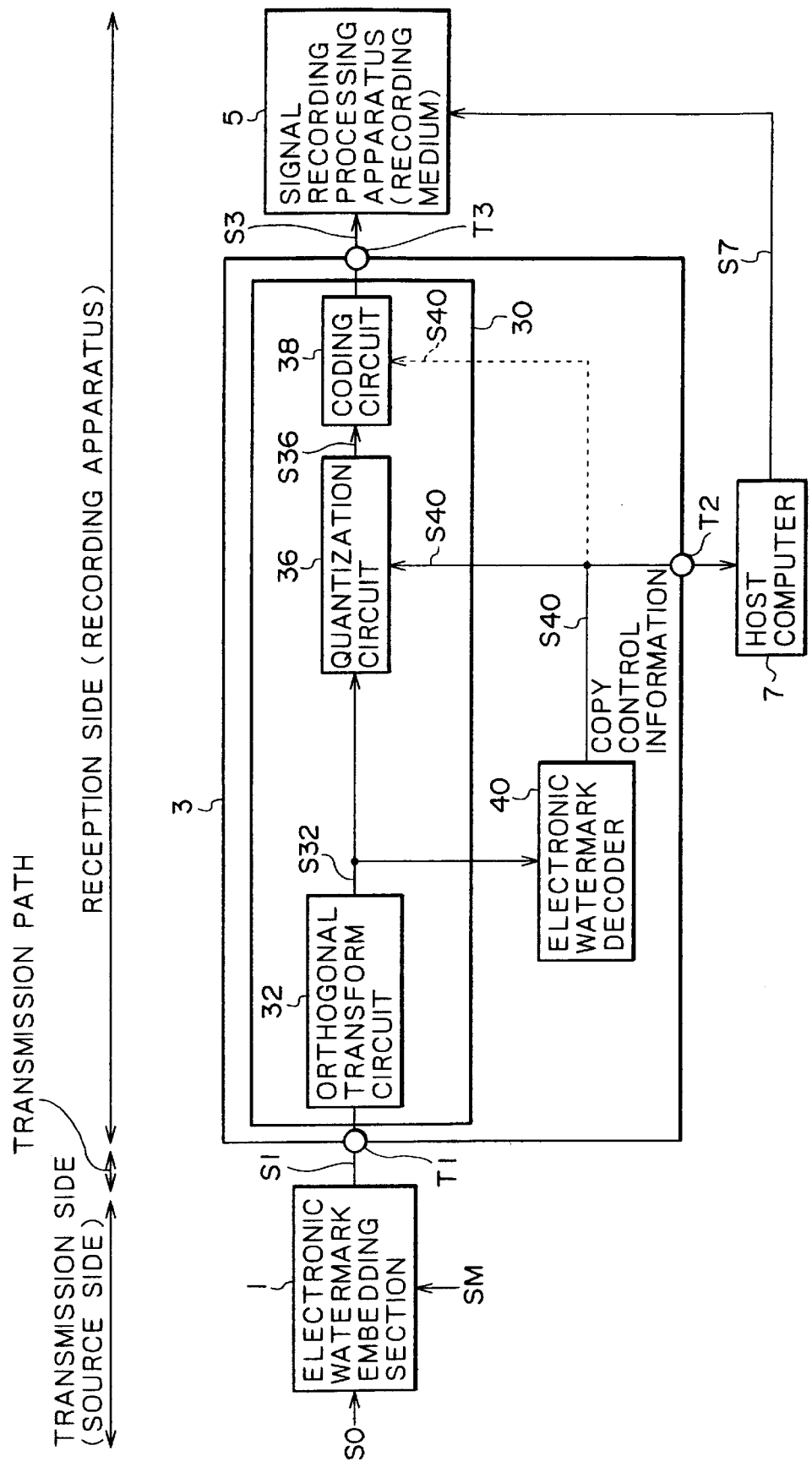
FIG. 8 is a block diagram of an electronic watermark signal compression processing system in which a coding circuit and a data processing apparatus to which the present invention is applied are incorporated.

Referring to FIG. 8, there is shown a construction of an electronic watermark signal compression processing system in which a coding circuit and a data processing apparatus to which the present invention is applied are incorporated.

The data processing apparatus shown includes a transmission side (or source side) apparatus, a transmission path and a reception side apparatus. The transmission side apparatus includes an electronic watermark embedding section 1. The reception side apparatus includes an electronic watermark decoding and signal compression circuit block 3, a signal recording processing apparatus 5 and a host computer 7.

The reception side apparatus corresponds to a data processing apparatus to which the present invention is applied, and the electronic watermark decoding and signal compression circuit block 3 corresponds to a coding apparatus to which the present invention is applied.

Electronic Watermark Embedding Technique

An electronic watermark technique and an electronic watermark embedding technique including copy control information which is performed by the electronic watermark embedding section 1 are described.

The electronic watermark technique is a technique of embedding some information into information (contents) such as a video signal or an audio signal so that the contents may have the information as hidden information.

Where the contents are a video signal, an electronic watermark is embedded into the video data in such a form that it can be perceived (visually observed) less likely by the eyes of a human being while the characters of the video signal itself are maintained.

Where the contents are an audio signal, an electronic watermark is embedded into the audio signal in such a form that it can be perceived less likely by the ears of a human being while the characters of the audio signal itself are maintained.

When an electronic watermark is embedded into information (contents), usually the following requirements are required. The first requirement is that the embedded electronic watermark continue to remain in the contents. The second requirement is that it cannot be detected readily at which positions of the contents the embedded electronic watermark is embedded. The third requirement is that, even if the electronic watermark is embedded in the contents, the contents maintain their originality and the contents themselves be not changed in quality or deteriorated by the electronic watermark thus embedded.

Conditions which satisfy such requirements as described above are examined with regard to a video signal as such contents. An electronic watermark is embedded as noise into a portion which exists in a video signal and is not significant on the perception of a human being, that is, a redundant portion of the video signal. As a result, there is an advantage that, even if noise is embedded, the overall data amount does not vary. Since the video signal is concentrated at low frequency band portions and the redundancy increases as the frequency increases, an electronic watermark is embedded into a high frequency portion of the video signal. However, if an electronic watermark is embedded only into a redundant portion of high frequency band components, then upon data compression, the electronic watermark is removed readily by means of a low-pass filter. In addition, even if the electronic watermark is removed, since the picture quality (sound quality) varies little, it cannot be detected that the electronic watermark has been removed. Therefore, an electronic watermark is embedded not only into redundant components but also into major portions.

Conditions which satisfy the requirements described above are examined with regard to an audio signal as contents. Since an audio signal usually has an audible sound frequency band of 20 to 20,000 Hz, electronic watermark information can be embedded into redundant portions provided by the frequency bands on the opposite sides of the audible sound frequency band and also into a major portion provided by the audible sound frequency band.

The electronic watermark embedding section 1 embeds an electronic watermark SM into original contents S0 taking the conditions described above into consideration and signals resulting information (electronic watermark embedding information) S1 into the transmission path.

Upon the embedding of the electronic watermark by the electronic watermark embedding section 1, information including copy control (CC) information indicative of one of inhibition of copying and permission of copying is embedded as an electronic watermark into the original contents S0. In other words, the electronic watermark embedding information S1 is a signal which is composed of the original contents S0 in which not only an ordinary electronic watermark such as copyright information is embedded but also an electronic watermark which represents CC information indicating whether or not copying should be inhibited is embedded.

An example of the original contents S0 and details of a method of embedding an electronic watermark including CC information into the original contents S0 are hereinafter described.

The electronic watermark decoding and signal compression circuit block 3 includes a signal compression circuit block 30 and an electronic watermark decoder (electronic watermark detection circuit block) 40.

The signal compression circuit block 30 includes an orthogonal transform circuit 32, a quantization circuit 36, and a coding circuit 38.

In the present embodiment, as countermeasures for protection of a signal against stealing and alteration, (1) integral construction of the electronic watermark decoding and signal compression circuit block 3 which makes signal accessing from the outside difficult and (2) invalidation processing of a signal in the internal circuits of the electronic watermark decoding and signal compression circuit block 3 when inhibition of copying is indicated are employed.

Integral Construction of the Electronic Watermark Decoding and Signal Compression Circuit Block 3

As a first countermeasure for prevention of stealing and alteration of a signal, at least the above-mentioned orthogonal transform circuit 32, quantization circuit 36 and coding circuit 38 in the signal compression circuit block 30 are constructed integrally as a unitary block so that signals internally processed therein and signals communicated therebetween cannot be accessed from the outside. Preferably, also the electronic watermark detection circuit block 40 is formed integrally together with the signal compression circuit block 30 into the electronic watermark decoding and signal compression circuit block 3.

For the integral construction, (1) a method wherein the circuits in the signal compression circuit block 30 and the electronic watermark detection circuit block 40 are accommodated in a single circuit such as a one-chip integrated circuit (IC), (2) another method wherein, where each of the orthogonal transform circuit 32, quantization circuit 36, coding circuit 38 and electronic watermark detection circuit block 40 is formed as a one-chip IC, they are accommodated in a single printed circuit board and (3) a further method wherein processing of the electronic watermark decoding and signal compression circuit block 3 is implemented by a single digital signal processor (DSP) are available. If the electronic watermark decoding and signal compression circuit block 3 is formed integrally as a unitary block in this manner, then internal processing conditions of the electronic watermark decoding and signal compression circuit block 3 cannot be accessed from the outside, and consequently, the electronic watermark decoding and signal compression circuit block 3 achieves a very high degree of security.

In the example shown in FIG. 8, an external apparatus can perform information exchange with the electronic watermark decoding and signal compression circuit block 3 only through an input terminal T1 to which the electronic watermark embedding information S1 is applied, an output terminal T3 from which electronic watermark embedding coding information S3 which is an output signal of the coding circuit 38 is outputted, and a control signal output terminal T2 from which copy control information S40 from the electronic watermark detection circuit block 40 is outputted. In other words, the electronic watermark decoding and signal compression circuit block 3 is constructed so that it outputs only minimized signals necessary for processing by the signal recording processing apparatus 5.

Operation (Invalidation Processing) of the Electronic Watermark Decoding and Signal Compression Circuit Block 3

The orthogonal transform circuit 32, quantization circuit 36 and coding circuit 38 have an apparatus construction for compression coding processing of a signal known as a JPEG (Joint Photographic coding Experts Group) technique for compression coding of still picture data or an MPEG (Moving Picture coding Experts Group) technique for compression coding of moving picture data and an audio signal.

In the following, operation of the signal compression circuit block 30 upon compression coding processing not specifically of an audio signal or a video signal but of general information (contents) is described.

The orthogonal transform circuit 32 orthogonally transforms electronic watermark embedding information S1 signaled from the electronic watermark embedding section 1 and outputs resulting orthogonal transform processing signal S32.

The orthogonal transform of a signal is a frequency analysis technique of a signal for converting electronic watermark embedding information S1 in a real time domain into a signal of a form in a frequency domain and is a transform technique applied widely to coding of a video signal and an audio signal. As representative orthogonal transform techniques, Fourier transform processing, preferably, fast Fourier transform (FFT) processing, discrete fast Fourier transform (DFT) processing, discrete cosine transform (DCT) processing, mDCT (modified DCT) which is a modified form of the DCT, wavelet transform and other various orthogonal transform methods are known. Also in the present embodiment, any of the listed transform techniques can be applied.

A particular example of the orthogonal transform circuit 32 is hereinafter described in connection with a particular example of the electronic watermark embedding section 1.

The quantization circuit 36 quantizes the orthogonal transform processing signal S32. Details of the quantization are hereinafter described in connection with a particular example of information (contents).

The coding circuit 38 compression codes the quantization signal S36 quantized by the quantization circuit 36 into electronic watermark embedding coding information S3 and outputs the electronic watermark embedding coding information S3 from the output terminal T3 to the signal recording processing apparatus 5. Details of the coding are hereinafter described in connection with a particular example of information (contents) and a particular example of the quantization circuit 36.

The electronic watermark decoder 40 receives the orthogonal transform processing signal S32 and detects copy control information embedded in the electronic watermark embedding information S1 and indicative of whether or not copying should be inhibited. Since the electronic watermark embedding information S1 has been orthogonally transformed into a signal of a frequency band of a sub band by the orthogonal transform circuit 32, the electronic watermark decoder 40 readily detects the electronic watermark embedded by the electronic watermark embedding section 1 and produces copy control (CC) information S40 from the detected electronic watermark.

The method of embedding an electronic watermark including information indicative of inhibition of copying or permission of copying by the electronic watermark embedding section 1, the detection method by the electronic watermark decoder 40 and the method of production of the copy control information S40 by the electronic watermark decoder 40 are hereinafter described in regard to particular examples thereof.

The quantization circuit 36 receives and quantizes the orthogonal transform processing signal S32. Here, the quantization circuit 36 quantizes the orthogonal transform processing signal S32 normally when the copy control information S40 produced by the electronic watermark decoder 40 indicates permission of copying. However, if the copy control information S40 indicates inhibition of copying, then the quantization circuit 36 does not quantize the orthogonal transform processing signal S32 normally but, for example, sets a parameter having no relation to the orthogonal transform processing signal S32 so that a quantization result thereof may have a quite insignificant value. This signal processing is called "invalidation processing". The quite insignificant value of the parameter may be a value of all zeros or a random value.

The coding circuit 38 codes the quantization signal S36 quantized by the quantization circuit 36. If the copy control information S40 indicates permission of copying, then the quantization signal S36 is a result of normal quantization by the quantization circuit 36, and also the coding circuit 38 compresses and codes the normally quantized quantization signal S36 normally. However, if the copy control information S40 indicates inhibition of copying, then since the coding circuit 38 codes the quantization signal S36 which is insignificant, then the result of coding thereof exhibits a value having no relation to the electronic watermark embedding information S1. Further, if the copy control information S40 is applied to the coding circuit 38 as indicated by a broken line in FIG. 8 and indicates inhibition of copying, then the coding circuit 38 may signal insignificant data irrespective of the value of the quantization signal S36 as electronic watermark embedding coding information S3.

The host computer 7 receives the copy control information S40 and produces a control signal S7 for permitting a recording operation of the signal recording processing apparatus 5 when the copy control information S40 indicates permission of copying, but produces, when the copy control information S40 indicates inhibition of copying, a control signal S7 which indicates inhibition of a recording operation of the signal recording processing apparatus 5.

As described above, when the copy control information S40 indicates permission of copying, the electronic watermark embedding coding information S3 obtained by coding the orthogonal transform processing signal S32 normally is applied from the coding circuit 38 to the signal recording processing apparatus 5, and the signal recording processing apparatus 5 records the electronic watermark embedding coding information S3 onto a recording medium such as, for example, a CD, an MD (mini disc) or a DVD in accordance with the control signal S7 from the host computer 7. However, when the copy control information S40 indicates inhibition of copying, the signal recording processing apparatus 5 does not perform recording processing in accordance with the control signal S7 from the host computer 7.

In this manner, only when the copy control information (CC information) included in the electronic watermark embedding information S1 indicates permission of copying and the electronic watermark decoder 40 detects the copy control information to produce copy control information S40 and then the host computer 7 produces a control signal S7 for permitting a recording operation of the signal recording processing apparatus 5, the signal recording processing apparatus 5 records the electronic watermark embedding coding information S3.

Operation of the system when the copy control information (CC information) S40 or the control signal S7 is altered is described.

It is assumed that the copy control information S40 indicative of inhibition of copying is altered outside the electronic watermark decoding and signal compression circuit block 3 and applied to the host computer 7 and the host computer 7 thus produces a control signal S7 for permitting a recording operation of the signal recording processing apparatus 5. As a result, the signal recording processing apparatus 5 performs an operation of recording the electronic watermark embedding coding information S3 onto a recording medium. However, when the value of the copy control information S40 indicates inhibition of copying, since the electronic watermark decoding and signal compression circuit block 3 internally invalidates the signal, the resulting electronic watermark embedding coding information S3 is an insignificant signal. Accordingly, even if a signal indicative of inhibition of copying is altered intentionally so that the signal may indicate permission of copying, only a substantially insignificant signal is copied and meaningless copying is performed. Consequently, an effective protection effect against illegal copying is achieved.

The invalidation processing of a signal using the copy control information S40 in the signal compression circuit block 30 should be performed by at least one of the quantization circuit 36 and the coding circuit 38, but may be performed by both of them.

Alternatively, a switch circuit may be interposed between the orthogonal transform circuit 32 and the quantization circuit 36 such that, when the copy control information S40 indicates inhibition of copying, the switch circuit is switched off so that the orthogonal transform processing signal S32 may not be applied to the quantization circuit 36. In this instance, the quantization circuit 36 quantizes the orthogonal transform processing signal S32 whose value is 0. Or, a switch circuit may be provided in a stage following the coding circuit 38 such that, when the copy control information S40 indicates inhibition of copying, the switch circuit is switched off so that the electronic watermark embedding coding information S3 whose value is 0 may be outputted.

In this manner, the invalidation processing of a signal when copying is inhibited can be performed using various methods at an arbitrary component in the electronic watermark decoding and signal compression circuit block 3.

Effects of the First Embodiment

With the electronic watermark signal compression processing system of the first embodiment described above, illegal copying of effective coded data can be prevented (1) because the electronic watermark decoding and signal compression circuit block 3 is formed integrally as a unitary member to augment the security against signal accessing from the outside and (2) because, even if copy control information is altered so as to indicate permission of copying in a path from the terminal T2 to the host computer 7 or in a signal transmission path from the host computer 7 to the signal recording processing apparatus 5, only copying of invalidated data is performed as a result of invalidation processing performed in the electronic watermark decoding and signal compression circuit block 3 for a signal whose copying is inhibited.

More particular forms of the data processing apparatus shown in FIG. 8 are described.

First Form

As a first form, an example wherein an electronic watermark including copy control information is embedded into original contents S0 illustrated in FIG. 8 by the electronic watermark embedding section 1 when the original contents S0 is an audio signal.

First Example

A first example of an electronic watermark embedding method when the original contents S0 are an audio signal is described with reference to FIGS. 9A, 9B, 9C and 9D which illustrate a method of embedding an electronic watermark including copy control signal indicative of inhibition of copying or permission of copying into an audio signal.

Figure 9A:
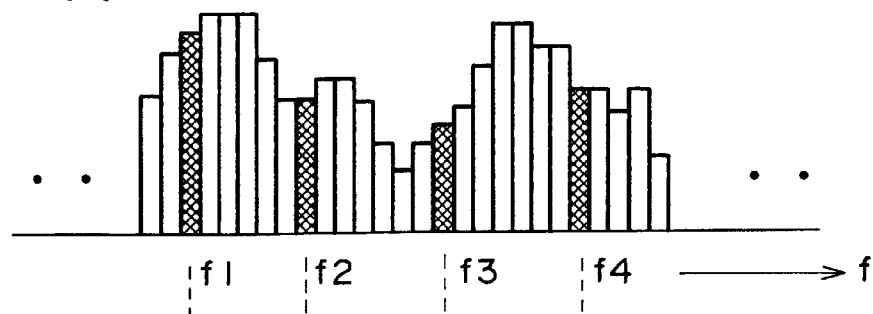
FIG. 9A is a graph illustrating processing of selecting frequency components of an audio signal as a first example of an electronic watermark embedding method.

The electronic watermark embedding section 1 performs fast Fourier transform (TFT) to frequency analyze the audio signal as illustrated in FIG. 9A to select frequency components f1, f2, f3 and f4, whose signals should be replaced with an electronic watermark as noise, taking the electronic watermark embedding conditions described hereinabove into consideration.

Figure 9B:
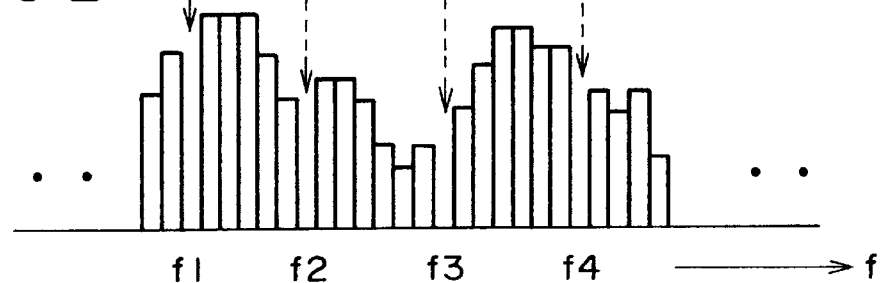
FIG. 9B is a graph illustrating the audio signal of FIG. 9A from which the selected frequency component data are deleted.

Then, the electronic watermark embedding section 1 deletes the signals of the selected frequency components as seen from FIG. 9B.

Figure 9C:
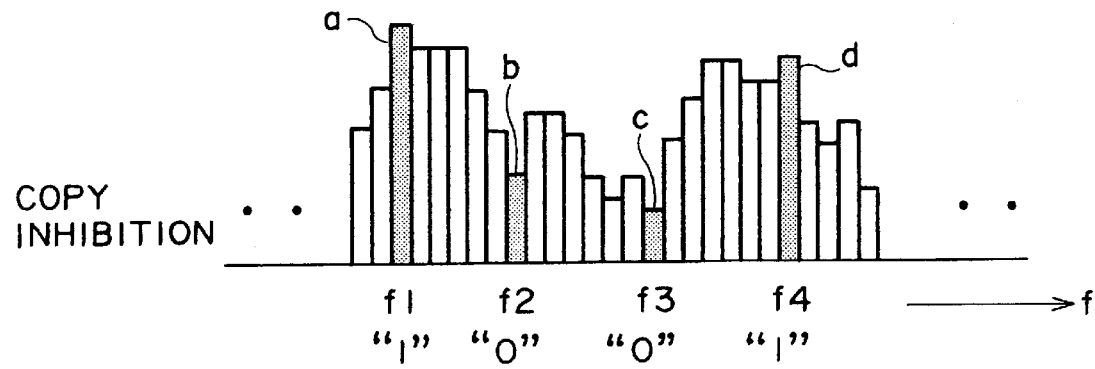
FIG. 9C is a graph illustrating processing of insertion of copy inhibition data into the deleted data portions of FIG. 9B.

The electronic watermark embedding section 1 embeds, when the copy control signal indicates inhibition of copying, data a, b, c and d shown in black as an electronic watermark as signals of the frequency components f1, f2, f3 and f4, respectively, in accordance with a method illustrated in FIG. 9C. However, when the copy control signal indicates permission of copying, the electronic watermark embedding section 1 embeds data $\alpha$, $\beta$, $\gamma$ and $\delta$ shown in black as an electronic watermark as signals of the frequency components f1, f2, f3 and f4, respectively, in accordance with a method illustrated in FIG. 9D. Both the data a, b, c and d and the data $\alpha$, $\beta$, $\gamma$ and $\delta$ are values which satisfy the electronic watermark embedding conditions and data for identification between inhibition of copying and permission of copying. In order to indicate inhibition of copying, the data a and d representative of "1" are each embedded with a value higher by several percent than a maximum amplitude of signals on the opposite sides of the frequency component f1 or f4. On the other hand, in order to indicate permission of copying, the data $\alpha$ and $\delta$ representative of "1" are each embedded with a value lower by several percent than a maximum amplitude of the signals on the opposite sides of the frequency component f1 or f4. Further, preferably the data b and c and the data $\beta$ and $\gamma$ representative of "0" are embedded with the values thereof made different between inhibition of copying and permission of copying. In the example shown, in order to indicate inhibition of copying, the data b and c representative of "0" are each embedded with an amplitude equal to two thirds a minimum amplitude of the signals on the opposite sides of the frequency component f2 or f3. On the other hand, in order to indicate permission of copying, the data $\beta$ and $\gamma$ representative of "0" are each embedded with an amplitude equal to one half a minimum amplitude of the signals on the opposite sides of the frequency component f2 or f3. It is a matter of course that the numerical values given above are mere examples.

The electronic watermark embedding information S1 wherein the electronic watermark SM including copy control information for identification between inhibition of copying and permission of copying is embedded in an audio signal as the original contents S0 is produced by the electronic watermark embedding section 1 and signaled to the electronic watermark decoding and signal compression circuit block 3.

The audio signal as the original contents S0 may be in the form of an analog signal or a digital signal. Where the original contents S0 is an analog audio signal, the FFT described above is performed for it after it is converted into a digital audio signal by A/D conversion.

Second Example

A second example of an electronic watermark embedding method when the original contents S0 is an audio signal is described with reference to FIG. 10 which illustrates processing of a method wherein a variation of a FFT coefficient obtained by FFT of the audio signal and different depending upon whether copying should be inhibited or permitted is added as noise to the audio signal.

Step 1: the electronic watermark embedding section 1 performs fast Fourier transform (FFT) processing of the audio signal to frequency analyze the audio signal. Consequently, the audio signal can be classified into high frequency components equal to or higher than 20,000 Hz, low frequency components equal to or lower than 20 Hz and intermediate frequency components from 20 to 20,000 Hz.

Steps 2 to 5: the electronic watermark embedding section 1 calculates variations of FFT components calculated for the different frequency bands as an electronic watermark (noise components) and adds the variations to the FFT components. The values of the variations are set comparatively high for the low frequency components equal to or lower than 20 Hz and the high frequency components equal to or higher than 20,000 Hz which are redundant and do not deteriorate the sound quality of an actual audio signal, but set comparatively low for the intermediate frequency components in the band of 20 to 20,000 Hz. The variations are noise components and an example of an electronic watermark. It is to be noted that such variations are set so that they cannot be removed uniformly in a transmission path by means of a filter or the like. Preferably, the variations as noise are added with such values which are not removed by the orthogonal transform circuit 32, coding circuit 38 and so forth. Further, the variations are set different depending upon whether copying should be permitted or inhibited. For example, the noise component "A" lower than 20 Hz for inhibition of copying is set to a value higher than the value of the noise component "a" lower than 20 Hz for permission of copying, and the noise component "B" higher than 20,000 Hz for inhibition of copying is set to a value higher than the value of the noise component "b" higher than 20,000 Hz for permission of copying. By making, for example, the magnitudes (amplitudes) of the noise components different at frequency portions other than audible sounds in this manner, an electronic watermark from which whether copying should be inhibited or permitted can be identified can be embedded into the audio signal as the original contents S0.

Preferably, noise components in the audible sound frequency band of 20 to 20,000 Hz are not made different depending upon whether copying should be inhibited or permitted. This is intended to minimize the influence of embedding of an electronic watermark.

The variations to be added as noise are preferably set to several percent or less the FFT coefficients taking an effect upon the sound quality into consideration.

By adding variations to FFT coefficients of all of the frequency bands of the result of the FFT, an electronic watermark which is not removed also by later compression processing and so forth can be embedded. Besides, since the variations are added at a predetermined ratio to the resulting values (coefficients) of the FFT applied to the audio signal, the electronic watermark information can be specified by the electronic watermark decoder 40.

Step 6: the electronic watermark embedding section 1 performs inverse Fourier transform (IFFT) processing for the audio signal obtained by the FFT processing and addition of the variations as an electronic watermark as described above to restore the original audio signal in the real space. However, the restored audio signal includes the variations as the electronic watermark as noise and is different from the original contents S0.

The electronic watermark embedding information S1 wherein the electronic watermark SM including the CC information is embedded in the audio signal is signaled to the electronic watermark decoding and signal compression circuit block 3.

The audio signal as the original contents S0 may be in the form of an analog signal or a digital signal. Where the original contents S0 is an analog audio signal, the FFT is performed after it is converted into a digital audio signal by A/D conversion.

Modification to the Second Example

The electronic watermark information to be embedded by the electronic watermark embedding section 1 is not limited to such variations as described above, but may be arbitrary data which can be specified (identified) as embedded electronic watermark information when reproduced.

The FFT and the inverse FFT used by the electronic watermark embedding section 1 may be replaced by another orthogonal transform technique (or frequency conversion technique) as represented by discrete cosine transform (DCT) and inverse DCT (IDCT). Also where the DCT is applied, since DCT coefficients are obtained, variations depending upon whether or not copying should be inhibited are added to the coefficients and then inverse DCT is performed. Also in this instance, noise components are embedded into low frequency components, high frequency components and major frequency portions. However, the amount of noise to be embedded into the major components is set comparatively low so that it may not substantially have an influence on the sound quality.

For embedding of electronic watermark information into video data, not only such orthogonal transform techniques but also any other electronic watermark embedding technique can be applied.

Processing on the Reception Side

Figure 11:
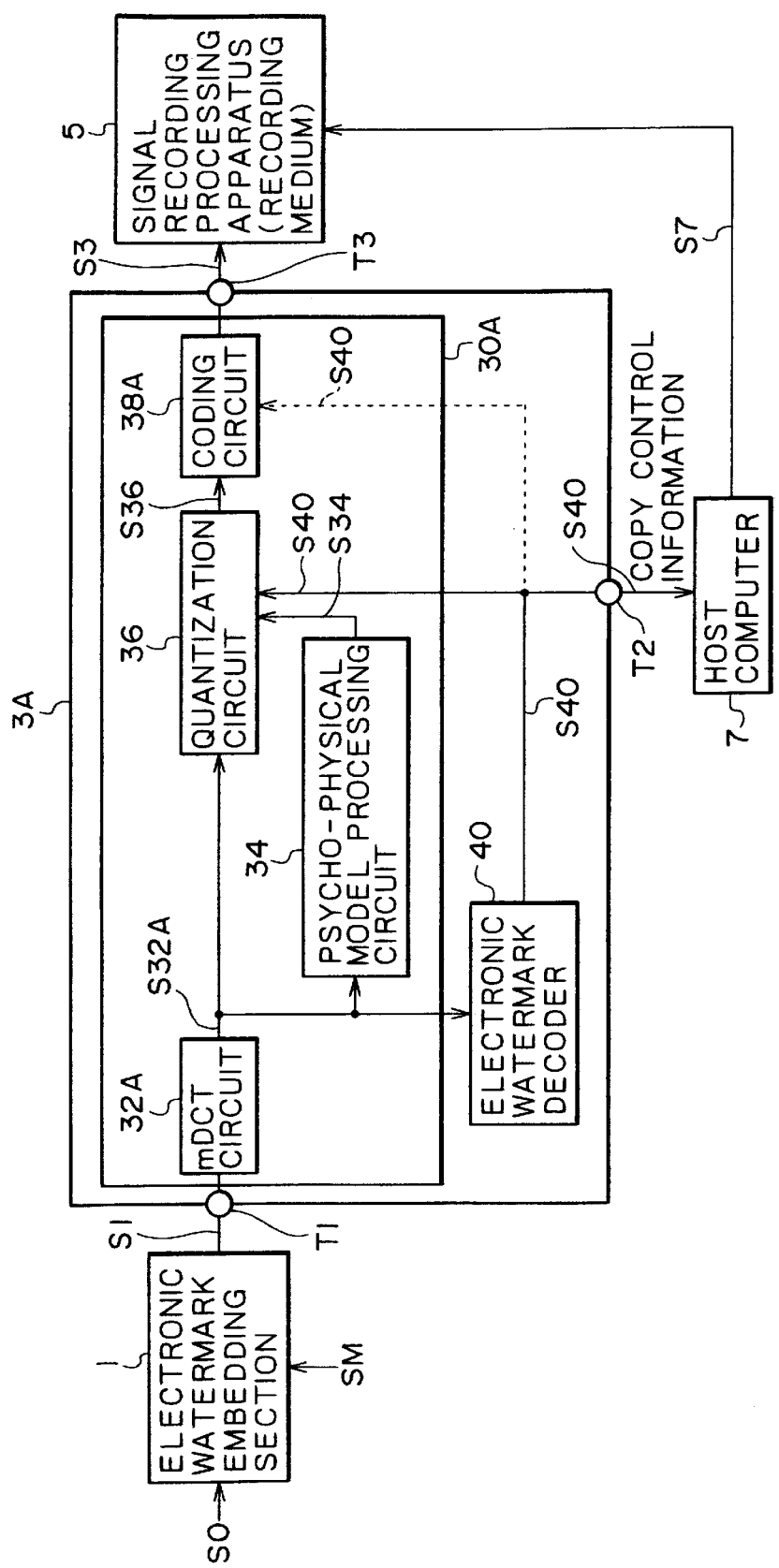
FIG. 11 is a block diagram showing a detailed construction of a form of the electronic watermark signal compression processing system shown in FIG. 8.

A construction and operation of the reception side apparatus when the electronic watermark embedding information S1 is transmitted to the reception side apparatus by the method described as the first example or the second example described above where the original contents S0 is an audio signal are described below with reference to FIG. 11 which shows a construction of a electronic watermark decoding and signal compression circuit block 3A which processes a signal wherein an electronic watermark including copy control signal (CC information) is embedded in an audio signal.

The electronic watermark decoding and signal compression circuit block 3A shown in FIG. 11 has a construction which is similar to the construction of the electronic watermark decoding and signal compression circuit block 3 described hereinabove with reference to FIG. 8 but is modified so as to suitably perform audio signal processing.

The electronic watermark decoding and adaptive transform acoustic coding (ATRAC: Adaptive TRansform Acoustic Coding) circuit block 3A includes a signal compression circuit block 30A which in turn includes a modified DCT (mDCT) circuit 32A, which is a modification to the orthogonal transform circuit 32, a quantization circuit 36, a coding circuit 38A and a psycho-physical model processing circuit 34, and an electronic watermark decoder 40.

The electronic watermark decoding and signal compression circuit block 3A is constructed so as to satisfy the two requirements described hereinabove in order to make stealing and alteration of a signal from or by the outside meaningless. A first one of the requirements is integral construction for maintaining the security against the outside, and a second one of the requirements is outputting of an invalidated coded signal when copying is inhibited.

The modified DCT (mDCT) circuit 32A performs DCT processing having a high efficiency for DCT transform of an audio signal which, for example, has a bit length of 8 bits or the like and has a narrow frequency band of approximately 20,000 Hz, and performs discrete cosine transform of the electronic watermark embedding information S1 described hereinabove in connection with the first or second example. By the modified DCT processing, the electronic watermark embedding information S1 is converted into an mDCT processing signal S32A of a sub band.

The electronic watermark decoder 40 detects copy control information (CC information) from the mDCT processing signal S32A of the sub band. Since the mDCT processing signal S32A is a sub band signal, the electronic watermark decoder 40 can detect an electronic watermark representative of permission or inhibition of copying readily from the mDCT processing signal S32A.

Figure 9D:
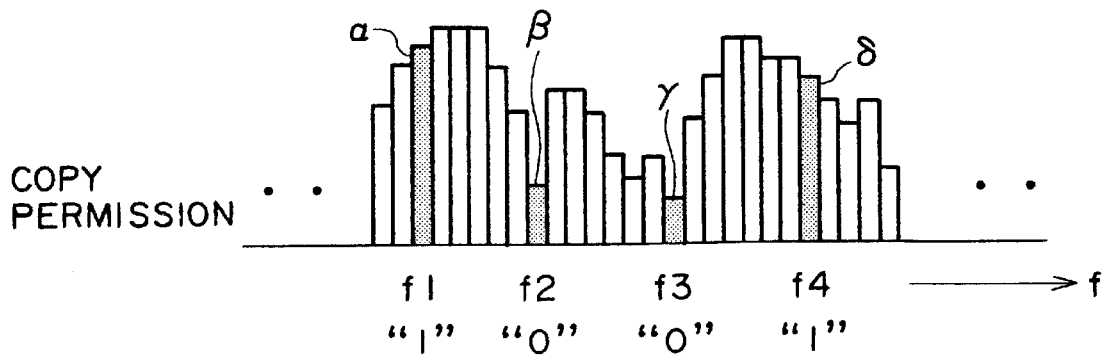
FIG. 9D is a graph illustrating processing of insertion of copy permission data into the deleted data portions of FIG. 9B.

When the electronic watermark embedding information S1 is produced by the method of the first example described hereinabove, the electronic watermark decoder 40 identifies the electronic watermark signal whether it is an electronic watermark signal indicative of inhibition of copying described hereinabove with reference to FIG. 9C or another electronic watermark signal indicative of permission of copying described hereinabove with reference to FIG. 9D, and outputs copy control information (CC information) S40 indicative of permission or inhibition of copying.

When the electronic watermark embedding information S1 is produced by the method of the second example described hereinabove, the electronic watermark decoder 40 identifies the variations added for identification of indication of inhibition or permission of copying described hereinabove with reference to FIG. 10 and produces copy control information S40 indicative of whether or not copying should be permitted.

The psycho-physical model processing circuit 34 determines an appropriate quantization level to be used by the quantization circuit 36 based on a psycho-physical model.

The psycho-physical model is a method of measuring a threshold value for the sense to a variation of a physical amount of a stimulus such as the auditory sense with regard to an audio signal and the sense of sight with regard to a video signal, a discrimination threshold level and a subjective equivalent value and modeling them.

In the present form, the psycho-physical model processing circuit 34 measures a threshold value for the auditory sense to a variation of an audio signal, a discrimination threshold value and a subjective equivalent value and models them to determine an appropriate quantization level for the quantization circuit 36.

The quantization circuit 36 refers to the quantization level determined by the psycho-physical model processing circuit 34 to quantize the mDCT processing signal S32A.

In the present example, the adaptive transform acoustic coding (ATRAC) processing circuit 30A is applied as a suitable example of the signal compression circuit block 30 for an audio signal.

The ATRAC (Adaptive TRansform Acoustic Coding) is a compression technique of extracting, based on the auditory sense psychology, frequency components in a descending order of the significance on the auditory sense using a characteristic of the threshold of audibility and a masking effect with regard to an audio signal until the information amount becomes equal to a predetermined amount. The ATRAC is a technique preferable to record an audio signal in an optimally compressed (coded) condition onto a recording medium which has a limitation to the recording capacity such as a mini disc.

The copy control information S40 is applied from the electronic watermark decoder 40 to the quantization circuit 36. When the copy control information S40 indicates inhibition of copying, the quantization circuit 36 outputs invalid data having no relation to the mDCT processing signal S32A as a quantization signal S36. The invalid data may be, for example, data of all zeros or a random number.

When the copy control information S40 is applied to the ATRAC coding circuit 38A and indicates inhibition of copying, the ATRAC coding circuit 38A outputs invalid data having no relation to the quantization signal S36 or the mDCT processing signal S32A as electronic watermark embedding coding information S3.

The invalidation processing when copying should be inhibited may be performed by either one or both of the quantization circuit 36 and the ATRAC coding circuit 38A.

The host computer 7 produces from the copy control information S40 a control signal S7 indicative of whether or not operation of the signal recording processing apparatus 5 should be permitted, and the signal recording processing apparatus 5 records the electronic watermark embedding coding information S3 onto a recording medium such as a CD or an MD in accordance with the control signal S7. Naturally, when the copy control information S40 indicates inhibition of copying, the signal recording processing apparatus 5 does not perform recording processing.

When the copy control information S40 indicates inhibition of copying, even if it is altered so as to indicate permission of copying, since the electronic watermark embedding coding information S3 is invalidated, effective copying of coded data is impossible.

Modification to the First Form

The first form can be applied not only to that described hereinabove but also in various modified forms.

While the modified DCT (mDCT) circuit 32A is described as an example of the orthogonal transform circuit 32, various orthogonal transform circuits which are widely used such as a FFT processing circuit, a DFT processing circuit and a wavelet circuit can be applied as the orthogonal transform circuit 32.

Further, while the adaptive transform acoustic coding (ATRAC) processing circuit 30A in the foregoing description is applied as an example of the compression coding circuit 30, a circuit for MPEG processing can be applied as the signal compression coding circuit 30.

Second Form

Operation of an example wherein electronic watermark information is embedded into a video signal as the original contents S0 and the resulting video signal is compression coded and recorded onto a recording medium such as a DVD by the signal recording processing apparatus 5 is described.

Electronic Watermark Embedding Technique of the Electronic Watermark Embedding Section 1

The embedding of an electronic watermark into a video signal is performed such that the requirements described hereinabove may be satisfied. In particular, the electronic watermark embedding section 1 performs orthogonal transform processing for a video signal and embeds noise components into high frequency components and major frequency components. However, the amount of noise to be embedded into major frequency components is set comparatively small so that it may not substantially have an influence on the picture quality. Then, the electronic watermark embedding section 1 performs transform inverse to the orthogonal transform for the video signal which has been orthogonally transformed with the electronic watermark embedded therein to restore the original video signal. Thereupon, also the noise embedded in the video signal is inversely transformed. When the electronic watermark embedding section 1 embeds an electronic watermark into an orthogonally transformed video signal, preferably noise components are embedded taking an effect when the video signal is restored by inverse orthogonal transform into consideration.

When an application of an electronic watermark embedding technique to a video signal is taken into consideration, as the electronic watermark embedding technique described above, preferably an orthogonal transform technique (or frequency conversion technique) as represented by fast Fourier transform (FFT) or discrete cosine transform (DCT) is applied.

Third Example

A first example (totally third example) of an electronic watermark embedding technique for a video signal wherein fast Fourier transform (FFT) is applied is described with reference to FIG. 12 which illustrates processing of a method wherein variations to FFT coefficients which are different depending upon whether copying should be inhibited or permitted are applied as noise to a video signal as an electronic watermark embedding method. The method illustrated in FIG. 12 is a technique which is somewhat common to the processing for an audio signal. However, it includes processing unique to a video signal as described below.

Step 11: the electronic watermark embedding section 1 performs fast Fourier transform (FFT) of a video signal to frequency analyze the video signal. Consequently, high frequency components, low frequency components and intermediate frequency components of the video signal are analyzed (extracted). As described hereinabove, the video signal includes significant signal components in the low frequency components, but includes less significant signals in the high frequency components.

Steps 12 to 15: the electronic watermark embedding section 1 adds variations to FFT coefficients determined for the individual frequency bands. The values of the variations are set comparatively high for high frequency components which are redundant and do not deteriorate the picture quality of an actual video signal, but set comparatively low for low frequency components. The variations are noise components and an example of an electronic watermark. It is to be noted that such variations are set so that they cannot be removed uniformly by means of a filter or the like in a transmission path. Further, the variations as noise are added with such values which are not removed by the orthogonal transform circuit 32, coding circuit 38 and so forth to a video signal of the original contents S0. Further, the variations are set different depending upon whether copying should be permitted or inhibited. For example, the noise component "A" of a high frequency region for inhibition of copying is set to a value higher than the value of the noise component "a" in the high frequency region for permission of copying. By making the magnitudes (amplitudes) of the noise components different, an electronic watermark from which whether copying should be inhibited or permitted can be identified can be embedded into the video signal as the original contents S0. Preferably, noise components in the low frequency region are not made different depending upon whether copying should be inhibited or permitted. This is intended to minimize the influence of embedding of an electronic watermark to the picture quality.

The variations to be added as noise are preferably set to several percent or less the FFT coefficients taking an effect upon the picture quality into consideration.

By adding variations to FFT coefficients of all of the frequency bands of the result of the FFT, an electronic watermark which is not removed also by later compression processing and so forth can be embedded. Besides, since the variations are added at a predetermined ratio to the resulting values (coefficients) of the FFT applied to the video signal, the electronic watermark information can be specified later.

Step 16: the electronic watermark embedding section 1 performs inverse Fourier transform (IFFT) processing for the video signal obtained by the FFT processing and addition of the variations as described above to restore the original video signal in the real space. However, the restored video signal includes the variations as the electronic watermark as noise and is different from the video signal of the original contents S0.

The electronic watermark embedding information S1 wherein the electronic watermark SM including the CC information is embedded in the video signal is signaled to the electronic watermark decoding and signal compression circuit block 3.

The video signal as the original contents S0 may be in the form of an analog signal or a digital signal. Where the original contents S0 is an analog video signal, the FFT is performed after it is converted into a digital video signal by A/D conversion.

Fourth Example

A second example (totally fourth example) of an electronic watermark embedding technique for a video signal wherein discrete cosine transform (DCT) is applied is described with reference to FIG. 13 which illustrates processing of a method wherein variations to DCT coefficients which are different depending upon whether copying should be inhibited or permitted are applied as noise to a video signal as an electronic watermark embedding method. The method illustrated in FIG. 13 is a technique which is somewhat common to the processing illustrated in FIG. 12. However, it includes processing unique to the DCT as described below.

Step 21: the electronic watermark embedding section 1 performs DCT of a video signal to frequency analyze the video signal.

Steps 22 to 25: the electronic watermark embedding section 1 adds variations to DCT coefficients determined for the individual frequency bands. The values of the variations are set comparatively high for high frequency components which are redundant and do not deteriorate the picture quality of an actual video signal, but set comparatively low for low frequency components. The variations are noise components and an example of an electronic watermark. Such variations are set so that they cannot be removed uniformly by means of a filter or the like in a transmission path. Further, the variations as noise are preferably added to a video signal of the original contents S0 so that they are not removed by the orthogonal transform circuit 32, coding circuit 38 and so forth. Further, the variations are set different in values depending upon whether copying should be permitted or inhibited. For example, the noise component "A" of a high frequency region for inhibition of copying is set to a value higher than the value of the noise component "a" in the high frequency region for permission of copying. By making the magnitudes (amplitudes) of the noise components different in this manner, an electronic watermark from which whether or not copying should be inhibited can be identified can be embedded into the video signal as the original contents S0. Preferably, noise components in the low frequency region are not made different depending upon whether or not copying should be inhibited. This is intended to minimize the influence of embedding of an electronic watermark to the picture quality.

The variations to be added as noise are preferably set to several percent or less the DCT coefficients taking an effect upon the picture quality into consideration.

By adding variations to DCT coefficients of all of the frequency bands of the result of the DCT, an electronic watermark which is not removed also by later compression processing and so forth can be embedded. Besides, since the variations are added at a predetermined ratio to the resulting values (coefficients) of the DCT applied to the video signal, the electronic watermark information can be specified in the electronic watermark decoder 40.

Step 26: the electronic watermark embedding section 1 performs inverse discrete cosine transform (IDCT) processing for the signal obtained by the DCT processing and addition of the variations as described above to restore the original video signal in the real space. However, the restored video signal includes the variations as the electronic watermark as noise and is different from the video signal of the original contents S0.

The electronic watermark embedding information S1 wherein the electronic watermark SM including the CC information is embedded in the video signal is signaled to the electronic watermark decoding and signal compression circuit block 3.

Fifth Example

As a third example (totally fifth example) of an electronic watermark embedding technique for a video signal, an electronic watermark may be embedded into a video signal in the following manner. In particular, the video signal is frequency analyzed to extract frequency components for which data are to be replaced as described above in connection with the first example in which an electronic watermark is embedded into an audio signal, and an electronic watermark indicative of copy control information is embedded into the frequency components of the video signal.

Process on the Reception Side

A construction and operation of the reception side apparatus when electronic watermark embedding information S1 is transmitted to the reception side apparatus using the method described hereinabove in connection with the third or fourth example where the original contents S0 are a video signal are described below with reference to FIG. 14 which shows a construction of an electronic watermark decoding and signal compression circuit block 3B which processes a signal wherein an electronic watermark including copy control information (CC information) is embedded in a video signal.

The electronic watermark decoding and signal compression circuit block 3B shown in FIG. 14 has a construction similar to the construction of the electronic watermark decoding and signal compression circuit block 3 described hereinabove with reference to FIG. 8, but is modified so as to be suitable for processing of a video signal.

The electronic watermark decoding and signal compression circuit block 3B includes a signal compression circuit block 30B which in turn includes a discrete cosine transform (DCT) circuit 32A, which is an example of the orthogonal transform circuit 32, a quantization circuit 36, and a coding circuit 38B, and an electronic watermark decoder 40. While the signal compression circuit block 30B shown in FIG. 14 does not include a circuit which corresponds to the psycho-physical model processing circuit 34 shown in FIG. 11, it may otherwise include the psycho-physical model processing circuit 34 in order to allow determination of the quantization level for the quantization circuit 36.

The electronic watermark decoding and signal compression circuit block 3B is constructed so as to satisfy the two requirements described hereinabove in order to make stealing and alteration of a signal from or by the outside meaningless. A first one of the requirements is integral construction for maintaining the security against the outside, and a second one of the requirements is outputting of an invalidated coded signal when copying is inhibited.

The DCT circuit 32B performs DCT processing having a high efficiency for DCT transform of a video signal which, for example, has a bit length of 16 bits or the like and has a wide frequency band, and performs discrete cosine transform of the electronic watermark embedding information S1 described hereinabove in connection with the third or fourth example. By the DCT processing, the electronic watermark embedding information S1 is converted into a DCT processing signal S32B of a sub band.

The electronic watermark decoder 40 detects copy control information (CC information) from the DCT processing signal S32B of the sub band. Since the DCT processing signal S32B is a sub band signal, the electronic watermark decoder 40 can detect copy control information representative of permission or inhibition of copying readily from the DCT processing signal S32B.

When the electronic watermark embedding information S1 is produced by the method of the third example described hereinabove, the electronic watermark decoder 40 detects whether the electronic watermark signal is indicative of inhibition of copying described hereinabove with reference to FIG. 12, and produces copy control information S40 indicative of whether or not copying should be permitted.

When the electronic watermark embedding information S1 is produced by the method of the fourth example described hereinabove, the electronic watermark decoder 40 identifies the variations added for identification of indication of inhibition or permission of copying described hereinabove with reference to FIG. 13 and produces copy control information S40 indicative of whether or not copying should be permitted.

The quantization circuit 36 quantizes the DCT processing signal S32B. If the psycho-physical model processing circuit 34 is provided, then the quantization circuit 36 refers to a result of the psycho-physical model processing circuit 34 to quantize the DCT processing signal S32B.

The copy control information S40 is applied from the electronic watermark decoder 40 to the quantization circuit 36. When the copy control information S40 indicates inhibition of copying, the quantization circuit 36 outputs invalid data having no relation to the DCT transform processing signal S32B as a quantization signal S36. The invalid data may be, for example, data of all zeros or a random number.

When the copy control information S40 is applied to the DCT coding circuit 38B and indicates inhibition of copying, the DCT coding circuit 38B outputs invalid data having no relation to the quantization signal S36 or the DCT coding signal S32B as electronic watermark embedding coding information S3.

The invalidation processing when copying should be inhibited may be performed by either one or both of the quantization circuit 36 and the DCT coding circuit 38B.

The host computer 7 produces a control signal S7 from the copy control information S40, and the signal recording processing apparatus 5 records the electronic watermark embedding coding information S3 onto a recording medium such as a DVD in accordance with the control signal S7. Naturally, when the copy control information S40 indicates inhibition of copying, the signal recording processing apparatus 5 does not perform recording processing.

When the copy control information S40 indicates inhibition of copying, even if it is altered so as to indicate permission of copying, since the electronic watermark embedding coding information S3 is invalidated, effective copying of coded data is impossible.

Processing of the reception side apparatus where an electronic watermark is embedded in a video signal as in the fifth example described hereinabove is similar to that of the method described hereinabove with reference to FIG. 11. However, similarly as upon the processing of a video signal described above, the orthogonal transform circuit 32 is a discrete cosine transform circuit, and also the coding circuit 38 is a discrete cosine transform circuit.

Modification to the Second Form

The second form described above can be applied in various modifications in addition to the form described above.

While the DCT circuit 32B is described as an example of the orthogonal transform circuit 32, also orthogonal transform circuits which are used widely such as a DFT processing circuit and a wavelet circuit can be applied as the orthogonal transform circuit 32.

Third Form

In the description of the first and second forms, coding processing only of an audio signal and coding processing only of a video signal are described respectively. However, normally a video signal and an audio signal are in most cases associated with each other in video signal processing. In order to simultaneously code a video signal and an audio signal, the first and second forms are combined suitably.

Fourth Form

While, in the forms described above, the original contents S0 are a video signal and/or an audio signal, coding processing can be performed in a similar manner as described above also for any other information (contents).

Second Embodiment

Referring now to FIG. 15, there is shown a construction of an encrypted signal compression processing system in which another coding circuit and another data processing apparatus to which the present invention is applied are incorporated.

Figure 4:
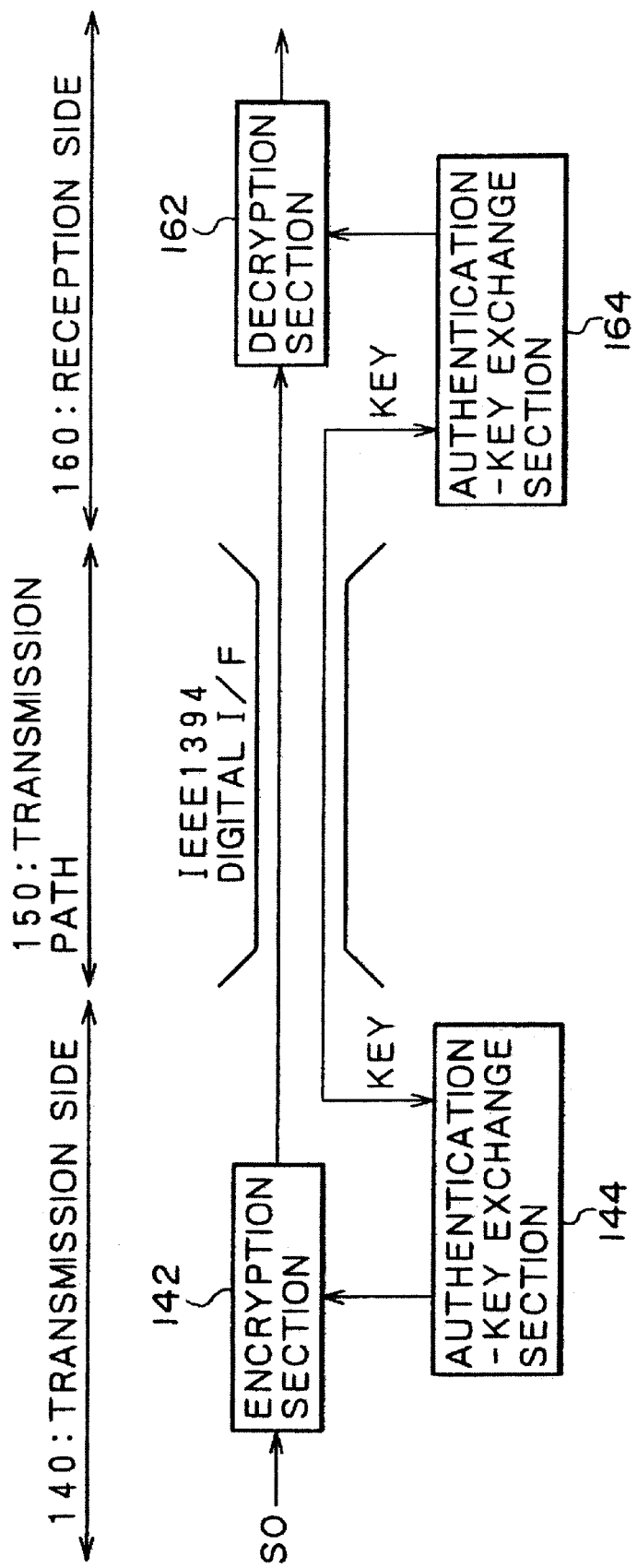
FIG. 4 is a block diagram showing an example of a construction of a SDB (Secure Digital Bus) system.
Figure 5A:
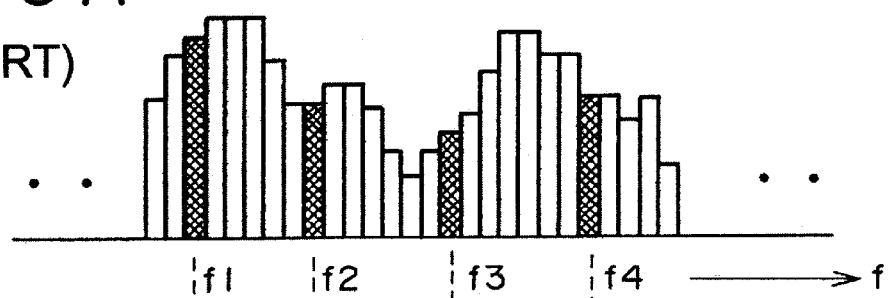
FIG. 5A is a graph illustrating processing of selecting frequency components of an analog audio signal.
Figure 5B:
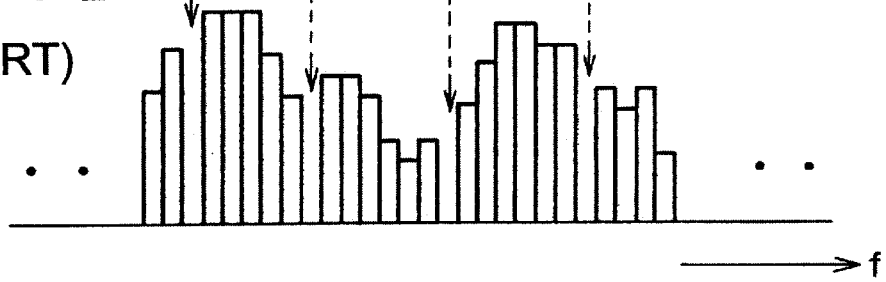
FIG. 5B is a graph illustrating the analog audio signal of FIG. 5A from which the selected frequency component data are deleted.
Figure 5C:
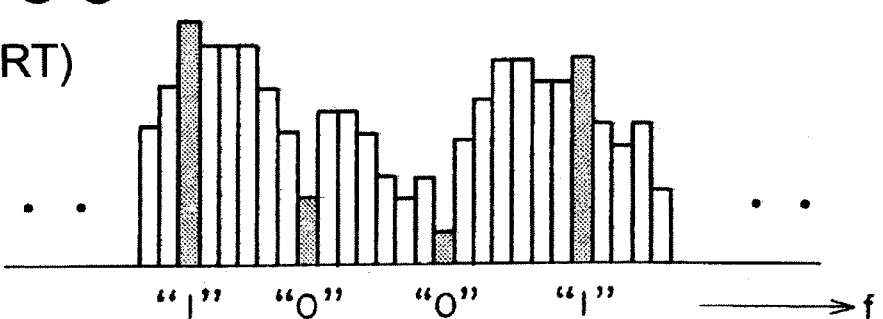
FIG. 5C is a graph illustrating processing of replacement of data into the deleted data portions of FIG. 5B.
Figure 6:
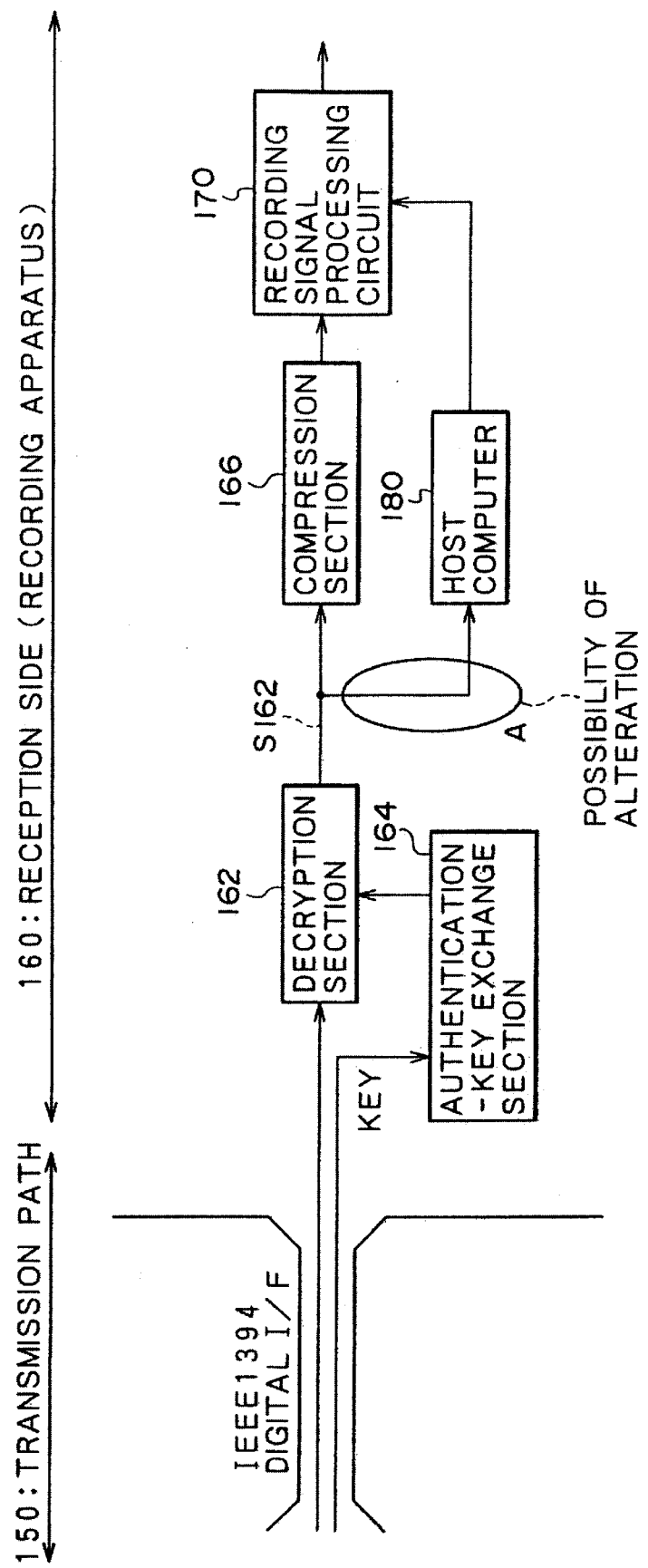
FIG. 6 is a block diagram illustrating alteration of data by the SDB system shown in FIG. 4.
Figure 7:
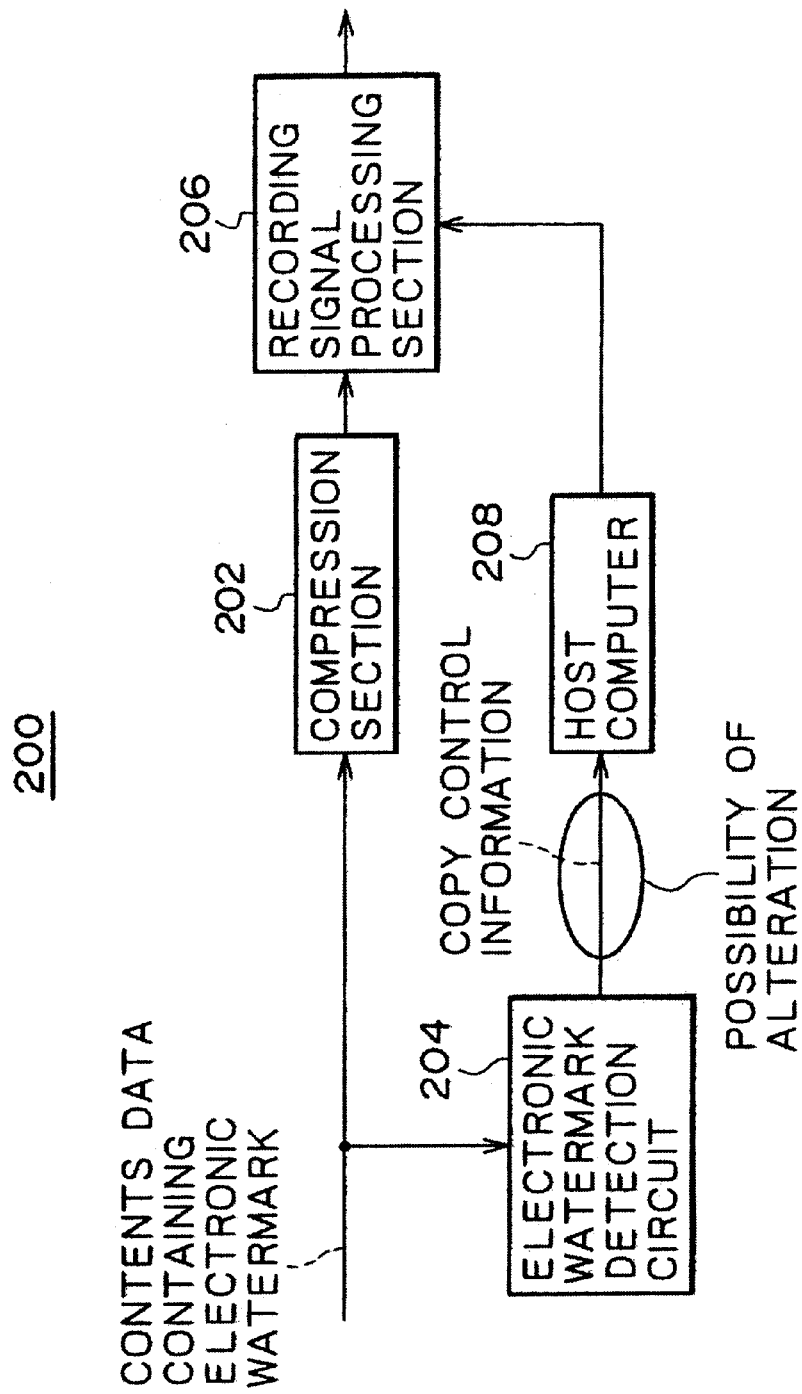
FIG. 7 is a block diagram illustrating alteration of data where an electronic watermark is embedded in electronic contents.

The encrypted signal compression processing system shown in FIG. 15 includes a transmission side apparatus 140, a signal transmission section 150 and a reception side apparatus 160 similarly to the SDB (Secure Digital Bus) system shown in FIG. 4, but is different in construction of the reception side apparatus 160 from that shown in FIG. 4 as seen in FIG. 15.

The reception side apparatus 160 corresponds to the data processing apparatus to which the present invention is applied, and an decryption-signal compression processing circuit block 4 described below corresponds to the coding apparatus to which the present invention is applied.

The transmission side apparatus 140 includes an encryption section 142 and an authentication-key exchange section 144.

The signal transmission section 150 has an IEEE 1394 digital interface.

The reception side apparatus 160 includes a decryption-signal compression processing circuit block 4, a signal recording processing apparatus 6, an authentication-key exchange section 8 and a host computer 10. The host computer 10 may alternatively be provided on the inside of the signal recording processing apparatus 6. In the present embodiment, however, the host computer 10 is provided outside the signal recording processing apparatus 6 taking it into consideration that the possibility is high that a signal from the decryption-signal compression processing circuit block 4 may be altered.

The decryption-signal compression processing circuit block 4 includes a decryption circuit 42 and a signal compression circuit 44. While the reception side apparatus 160 described hereinabove with reference to FIG. 4 includes only the decryption section 162 which corresponds to the decryption circuit 42, in the present embodiment, the signal compression circuit 44 is provided additionally. The signal compression circuit 44 not only compression encrypts information (contents) but also has a circuit which invalidates a coded output when copying is inhibited.

The internal circuits 42 and 44 of the decryption-signal compression processing circuit block 4 are formed so that the security of internal signal processing thereof may be maintained against the outside such that (1) they are formed integrally as a unitary member in a one-chip IC, (2) they are mounted, where each of the decryption circuit 42 and the signal compression circuit 44 is individually formed as an IC chip, on one printed circuit board, or (3) processing of the decryption circuit 42 and the signal compression circuit 44 is performed by a single digital signal processor (DSP).

In particular, that the decryption-signal compression processing circuit block 4 is formed integrally as a unitary member in the form of a one-chip IC, one printed circuit board or a DSP signifies that a signal of any internal connection of the unitary member cannot be extracted to the outside.

In the example shown in FIG. 15, an external circuit can perform information exchange with the decryption-signal compression processing circuit block 4 only through an input terminal T1 to which an encryption signal SE from the encryption section 142 is applied, an output terminal T2 from which a compression coded signal S4 which is an output signal of the signal compression circuit 44 is outputted, and a control signal output terminal T3 from which copy control information S42A from the decryption circuit 42 is outputted. As a result, decryption information S42 outputted from the decryption circuit 42 to the signal compression circuit 44 cannot be accessed from the outside. In this manner, the decryption-signal compression processing circuit block 4 is formed integrally as a unitary member having, as a basic structure, a structure which is high in security (secrecy) in that it does not allow accessing to an internal processing signal from the outside.

Subsequently, operation of the SDB system of FIG. 15 is described.

Authentication and Key Exchange

The authentication-key exchange section 144 of the transmission side apparatus 140 and the authentication-key exchange section 8 of the reception side apparatus 160 perform authentication processing over the signal transmission section 150, produce keys for transmission of ciphers and exchange the keys over the signal transmission section 150. Through the authentication procedure and the key exchange procedure, the transmission side apparatus 140 and the reception side apparatus 160 authenticate that they can mutually transmit data to the other parties with security.

Encryption Processing

Figure 1:
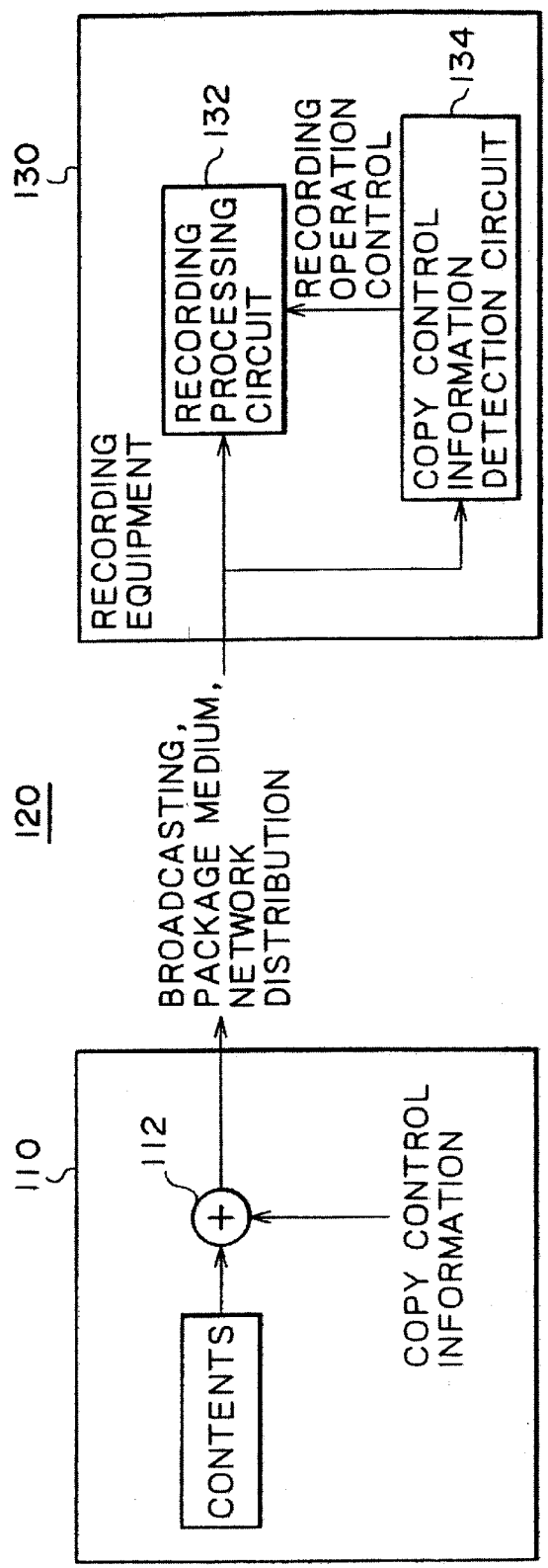
FIG. 1 is a block diagram illustrating a concept of a copy control method.
Figure 2:
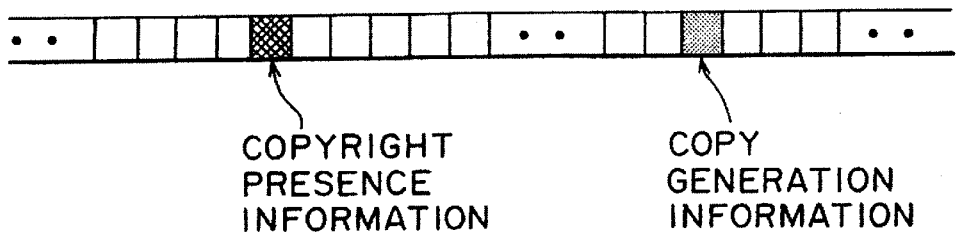
FIG. 2 is a diagrammatic view illustrating copyright information and copy generation information of a data stream of a digital audio interface.
Figure 3A:
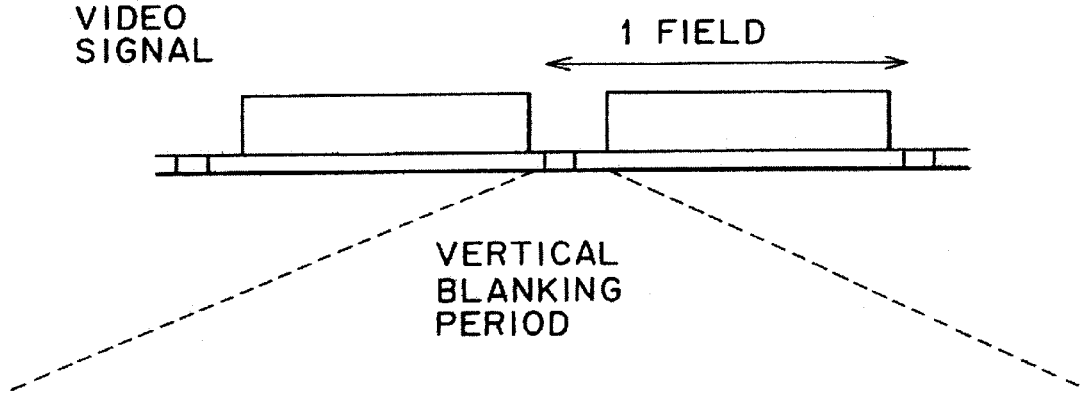
FIG. 3A is a diagrammatic view showing a signal waveform of digital video data.
Figure 3B:
FIG. 3B is a waveform diagram illustrating CGMS data inserted in a vertical blanking interval of the digital video data of FIG. 3A.

The encryption section 142 of the transmission side apparatus 140 encrypts original contents S0 using such a key as described above. The original contents S0 may be, for example, a video signal and/or an audio signal or the like. When the encryption section 142 encrypts the original contents S0, it also encrypts CCI (Copy Control Information) indicative of whether or not copying of an audio signal illustrated in FIG. 2 or a video signal illustrated in FIGS. 3A and 3B is inhibited and places the encrypted CCI into the encrypted signal of the original contents S0. Accordingly, the encryption signal SE includes not only the encrypted original contents S0 but also the encrypted CCI which indicates whether or not copying is inhibited. The encryption signal SE is received by the decryption circuit 42 of the decryption-signal compression processing circuit block 4 over the signal transmission section 150.

As described above, the present SDB system achieves data transmission of a high degree of security by authentication and key exchange as well as transmission of encrypted data. As a result, the SDB system has a high protection performance against alteration of a signal in the signal transmission section 150 and so forth.

Processing of the Decryption-Signal Compression Processing Circuit Block 4

The decryption circuit 42 of the decryption-signal compression processing circuit block 4 decrypts the encryption signal SE using the key from the authentication-key exchange section 8. As a result, the decryption circuit 42 outputs decryption information S42 including the initial original contents S0 obtained as a result of the decryption of the encrypted original contents S0 and the original CCI obtained as a result of decryption of the encrypted CCI, and CCI information S42A only including the deciphered CCI.

The signal compression circuit 44 performs normal compression coding processing of the decrypted original contents S0 when the CCI indicates permission of copying, but outputs data having no relation to the decrypted original contents S0, for example, data of all zeros or a random number when the CCI indicates inhibition of copying. In other words, when the CCI indicates inhibition of copying, the signal compression circuit 44 performs invalidation processing.

Recording Operation

The host computer 10 receives the CCI information S42A and produces a recording control signal S10 for controlling operation of the signal recording processing apparatus 6. When the CCI information S42A indicates inhibition of copying, the recording control signal S10 produced indicates inhibition of operation of the signal recording processing apparatus 6, but when the CCI information S42A indicates permission of copying, the recording control signal S10 indicates permission of operation of the signal recording processing apparatus 6.

The signal recording processing apparatus 6 records the compression coded signal S4 onto a recording medium only when the recording control signal S10 indicates permission of operation.

Alteration Processing

If the CCI information S42A or the recording control signal S10 is altered from indication of inhibition of copying to indication of permission of copying outside the decryption-signal compression processing circuit block 4, then the compression coded signal S4 invalidated by the signal compression circuit 44 in the decryption-signal compression processing circuit block 4 is applied to the signal recording processing apparatus 6. Therefore, even if the CCI information S42A or the recording control signal S10 is altered, the effective compression coded signal S4 cannot be recorded.

Third Embodiment

Encryption processing of original contents S0 by the encryption section 142 and processing by the signal compression circuit 44 of decrypting an encryption signal SE using a key can be performed in various forms.

Fifth Example

Where the original contents S0 are a moving picture video signal, the signal compression circuit 44 can use discrete cosine transform (DCT), which is applied to the MPEG2 and so forth, when the CCI information indicates permission of copying.

Where the original contents S0 are a still picture video signal, the signal compression circuit 44 can use a compression coding circuit, which is applied to the JPEG and so forth, when the CCI information indicates permission of copying.

When the CCI information indicates inhibition of copying, the signal compression circuit 44 outputs a compression coded signal S4 which includes all zeros or is a random number.

It is to be noted that, while it is described in the foregoing description that original contents are transmitted by the SDB, where compressed contents are received, the compression function of the signal compression circuit 44 can be bypassed.

Sixth Example

Where the original contents S0 are an audio signal, the signal compression circuit 44 may be formed from a modified discrete cosine transform (mDCT) circuit which is applied to the MPEG2 and so forth or an adaptive transform acoustic coding circuit (ATRAC circuit) when the CCI information indicates permission of copying.

When the CCI information indicates inhibition of copying, the signal compression circuit 44 outputs a compression coded signal S4 which is a signal of all zeros or a random number.

According to the present embodiment, since keys are exchanged and an encrypted signal is transmitted after authentication is performed between the transmission system and the reception system, the security in confirmation of the other party of communication and the transmission path is high, and the protection performance is high against alteration on the reception side.

Modification

The signal recording processing apparatus 5 shown in FIG. 8 and the signal recording processing apparatus 6 shown in FIG. 15 may be replaced by a signal transmission apparatus which transmits a coded signal to a circuit in the next stage, an editing apparatus or the like.

As described above, according to the coding apparatus of the present invention, since it is constructed such that it cannot be accessed from the outside to prevent otherwise possible alteration of an inwardly processed signal and besides it codes and outputs a signal of information wherein an electronic watermark including copy control information is embedded in original contents only when copying is permitted whereas it outputs an invalid coded signal when copying is inhibited, it is effective against alteration of an internal signal thereof from the outside.

According to the signal processing apparatus of the present invention, only when copying is permitted, a signal obtained by coding information wherein an electronic watermark including copy control information is embedded in original contents using the coding circuit described above can be used for processing such as recording.

What is claimed is:

1. A data processing apparatus for processing data in which additional data is embedded, comprising:

coding means for coding the data;

detection means for detecting the additional data from the data;

processing means for processing the coded data coded by said coding means; and control means for controlling operation of said processing means in response to the additional data detected by said detection means;

said coding means controlling an output thereof in response to the additional data detected by said detection means, accessing to the additional data used to control said coding means being inhibited, wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

2. A data processing apparatus according to claim 1, wherein said processing means includes recording means for recording the coded data onto a storage medium, and said control means controls recording of the data onto the storage medium by said recording means in response to the additional data detected by said detection means.

3. A data processing apparatus according to claim 1, wherein said processing means includes data transfer means for transferring the coded data, and said control means controls transfer of the data by said data transfer means in response to the additional data detected by said detection means.

4. A data processing apparatus according to claim 1, wherein said coding means and said detection means are formed in one chip.

5. A data processing apparatus according to claim 1, wherein said coding means and said detection means are accommodated on a single printed circuit board.

6. A data processing apparatus according to claim 1, wherein said coding means and said detection means are formed in a single digital signal processor.

7. A data processing apparatus according to claim 1, wherein said coding means includes orthogonal transform means for orthogonally transforming the data, and quantization means for quantizing an output of said orthogonal transform means, and said coding means codes an output of said quantization means.

8. A data processing apparatus according to claim 7, wherein said quantization means outputs a signal different from a result of the quantization thereby in response to the additional data.

9. A data processing apparatus according to claim 7, wherein said coding means outputs a signal different from a result of the coding thereby in response to the additional data.

10. A data processing apparatus according to claim 7, wherein said orthogonal transform means performs modified discrete cosine transform of the data to convert the data into a sub band signal.

11. A data processing apparatus according to claim 7, wherein said quantization means determines a quantization level for the sub band signal based on a psycho-physical model and quantizes the sub band signal based on the determined quantization level.

12. A data processing apparatus according to claim 7, wherein said coding means performs adaptive transform acoustic coding.

13. A data processing apparatus according to claim 7, wherein the data is formed by orthogonally transforming the data to calculate coefficients and superposing a signal for controlling operation of said processing means on the coefficients in response to a frequency band, and said detection means detects the signal for controlling the operation of said processing means.

14. A data processing apparatus according to claim 7, wherein said coding means performs discrete cosine transform processing.

15. A coding apparatus for coding data in which additional data is embedded, comprising:

coding means for coding the data; and detection means for detecting the additional data from the data;

said coding means controlling an output thereof in response to the additional data detected by said detection means, accessing to the additional data used to control said coding means being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

16. A coding apparatus according to claim 15, wherein the additional data detected by said detection means is used to control recording of the data onto a storage medium by external recording means.

17. A coding apparatus according to claim 15, wherein the additional data detected by said detection means is used to control transfer of the data by external data transfer means.

18. A coding apparatus according to claim 15, wherein said coding means and said detection means are formed in one chip.

19. A coding apparatus according to claim 15, wherein said coding means and said detection means are accommodated on a single printed circuit board.

20. A coding apparatus according to claim 15, wherein said coding means and said detection means are formed in a single digital signal processor.

21. A coding apparatus according to claim 15, wherein said coding means includes orthogonal transform means for orthogonally transforming the data, and quantization means for quantizing an output of said orthogonal transform means, and said coding means codes an output of said quantization means.

22. A coding apparatus according to claim 21, wherein said quantization means outputs a signal different from a result of the quantization thereby in response to the additional data.

23. A coding apparatus according to claim 21, wherein said coding means outputs a signal different from a result of the coding by said coding means in response to the additional data.

24. A coding apparatus according to claim 21, wherein said orthogonal transform means performs modified discrete cosine transform of the data to convert the data into a sub band signal.

25. A coding apparatus according to claim 21, wherein said quantization means determines a quantization level for the sub band signal based on a psycho-physical model and quantizes the sub band signal based on the determined quantization level.

26. A coding apparatus according to claim 21, wherein said coding means performs adaptive transform acoustic coding.

27. A coding apparatus according to claim 21, wherein the data is formed by orthogonally transforming the data to calculate coefficients and superposing the additional data on the coefficients in response to a frequency band, and said detection means detects the additional data.

28. A coding apparatus according to claim 21, wherein said coding means performs discrete cosine transform processing.

29. A data processing apparatus for processing encrypted data of data in which additional data is embedded, comprising:

decryption means for decrypting the encrypted data into the data and the additional data;

coding means for coding the decrypted data decrypted by said decryption means;

processing means for processing the coded data coded by said coding means; and control means for controlling operation of said processing means in response to the additional data decrypted by said decryption means;

said coding means controlling an output thereof in response to the additional data decrypted by said decryption means, accessing to the additional data to be used to control said coding means being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

30. A coding apparatus for coding encrypted data of data in which additional data is embedded, comprising:

decryption means for decrypting the encrypted data into the data and the additional data; and coding means for coding the decrypted data decrypted by said decryption means;

said coding means controlling an output thereof in response to the additional data decrypted by said decryption means, accessing to the additional data to be used to control said coding means being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

31. A data processing method for processing data in which additional data is embedded, comprising:

a coding step of coding the data;

a detection step of detecting the additional data from the data;

a processing step of processing the coded data coded by the coding step; and a control step of controlling the processing in response to the additional data detected by the detection step;

an output of the coding step being controlled in response to the additional data detected by the detection step, accessing to the additional data being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

32. A coding method for coding data in which additional data is embedded, comprising:

a coding step of coding the data; and a detection step of detecting the additional data from the data;

an output of the coding step being controlled in response to the additional data detected by the detection step, accessing to the additional data being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

33. A data processing method for processing encrypted data of data in which additional data is embedded, comprising:

a decryption step of decrypting the encrypted data into the data and the additional data;

a coding step of coding the decrypted data decrypted by the decryption step;

a processing step of processing the coded data coded by the coding step; and a control step of controlling the processing in response to the additional data decrypted by the decryption step;

an output of the coding step being controlled in response to the additional data decrypted by the decryption step, accessing to the additional data being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

34. A coding method for coding encrypted data of data in which additional data is embedded, comprising:

a decryption step of decrypting the encrypted data into the data and the additional data; and a coding step of coding the decrypted data decrypted by the decryption step;

an output of the coding step being controlled in response to the additional data decrypted by the decryption step, accessing to the additional data being inhibited;

wherein the data is formed by frequency analyzing the data to select frequency components to be operated, deleting the selected frequency components from the data and embedding a signal for controlling operation of said processing means into the deleted frequency components, and said detection means detects the signal for controlling the operation of said processing means.

35. A data processing apparatus for processing data in which additional data is embedded, comprising:

coding means for coding the data;

detection means for detecting the additional data from the data;

processing means for processing the coded data coded by said coding means; and control means for controlling operation of said processing means in response to the additional data detected by said detection means;

said coding means controlling an output thereof in response to the additional data detected by said detection means, accessing to the additional data used to control said coding means being inhibited;

wherein said coding means includes orthogonal transform means for orthogonally transforming the data, and quantization means for quantizing an output of said orthogonal transform means, said coding means codes an output of said quantization means, and said quantization means determines a quantization level for the sub band signal based on a psycho-physical model and quantizes the sub band signal based on the determined quantization level.

36. A coding apparatus for coding data in which additional data is embedded, comprising:

coding means for coding the data; and detection means for detecting the additional data from the data;

said coding means controlling an output thereof in response to the additional data detected by said detection means, accessing to the additional data used to control said coding means being inhibited;

wherein said coding means includes orthogonal transform means for orthogonally transforming the data, and quantization means for quantizing an output of said orthogonal transform means, said coding means codes an output of said quantization means, and said quantization means determines a quantization level for the sub band signal based on a psycho-physical model and quantizes the sub band signal based on the determined quantization level.

* * * * *